United States Patent
McElvain et al.

(10) Patent No.: US 8,569,433 B2
(45) Date of Patent: *Oct. 29, 2013

(54) ENERGY EFFICIENT POLYOLEFIN PROCESS

(71) Applicants: Chevron Phillips Chemical Company LP, The Woodlands, TX (US); Penny A. Zellers, Bartlesville, OK (US)

(72) Inventors: Robert R. McElvain, Kingwood, TX (US); John D. Hottovy, Kingwood, TX (US); Ralph W. Romig, Kingwood, TX (US); Donald W. Verser, Houston, TX (US); David H. Burns, Houston, TX (US); John H. Tait, Stafford, TX (US); Richard Peacock, Missouri City, TX (US); James E. Hein, Houston, TX (US); Scott E. Kufeld, Houston, TX (US); Carl W. Fenderson, Oklahoma City, OK (US); Anurag Gupta, Sugarland, TX (US); Dale A. Zellers, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,357

(22) Filed: Oct. 19, 2012

(65) Prior Publication Data

US 2013/0056899 A1    Mar. 7, 2013

Related U.S. Application Data

(60) Division of application No. 13/372,979, filed on Feb. 14, 2012, now Pat. No. 8,303,899, which is a continuation of application No. 13/207,262, filed on Aug. 10, 2011, now Pat. No. 8,128,877, which is a division of application No. 11/213,374, filed on Aug. 26, 2005, now Pat. No. 8,017,701.

(60) Provisional application No. 60/604,948, filed on Aug. 27, 2004.

(51) Int. Cl.
| C08F 2/00 | (2006.01) |
| C08F 4/00 | (2006.01) |
| C08F 210/00 | (2006.01) |
| B01J 10/00 | (2006.01) |

(52) U.S. Cl.
USPC ............... 526/67; 526/68; 526/69; 526/70; 526/72; 526/89; 526/348; 422/129

(58) Field of Classification Search
USPC .............. 422/129; 526/67, 68, 69, 70, 72, 89, 526/348
See application file for complete search history.

(56) References Cited

U.S. PATENT DOCUMENTS

| 4,342,853 A | 8/1982 | Durand et al. |
| 4,424,341 A | 1/1984 | Hanson et al. |

(Continued)

FOREIGN PATENT DOCUMENTS

| EP | 0586244 A1 | 3/1994 |
| WO | WO 00/53306 A1 | 9/2000 |

(Continued)

OTHER PUBLICATIONS

European Search Report, EP 10 18 1945 mailed Dec. 21, 2010.

*Primary Examiner* — William Cheung
(74) *Attorney, Agent, or Firm* — Fletcher Yoder, P.C.

(57) ABSTRACT

A manufacturing system for producing polyolefin includes a polymerization reactor, a flash chamber, and a purge column. In certain embodiments, the purge column may receive a solids stream directly from the flash chamber. Further, the purge column may function as a feed tank for an extruder within an extrusion/loadout system. According to certain embodiments, the manufacturing system may be configured to consume less than 445 kilowatt-hours of energy per metric ton of polyolefin produced based on consumption of electricity, steam, and fuel gas.

20 Claims, 11 Drawing Sheets

(56) References Cited

U.S. PATENT DOCUMENTS

| | | |
|---|---|---|
| 4,436,902 A | 3/1984 | Wood et al. |
| 4,439,601 A | 3/1984 | McCurdy et al. |
| 4,448,539 A | 5/1984 | Burgert |
| 4,461,889 A | 7/1984 | Hanson |
| 4,499,263 A | 2/1985 | Messura et al. |
| 4,501,885 A | 2/1985 | Sherk et al. |
| 4,528,337 A | 7/1985 | Kreilein et al. |
| 4,543,399 A | 9/1985 | Jenkins, III et al. |
| 4,589,957 A | 5/1986 | Sherk et al. |
| 4,613,484 A | 9/1986 | Ayres et al. |
| 4,632,976 A | 12/1986 | Asanuma et al. |
| 4,690,804 A | 9/1987 | Rohlfing |
| 4,737,280 A | 4/1988 | Hanson |
| 4,794,151 A | 12/1988 | Mueller-Mall et al. |
| 4,832,915 A | 5/1989 | Messura et al. |
| 5,183,866 A | 2/1993 | Hottovy |
| 5,207,929 A * | 5/1993 | Sung et al. .................... 210/774 |
| 5,225,465 A | 7/1993 | Eichenauer et al. |
| 5,272,236 A | 12/1993 | Lai et al. |
| 5,276,115 A | 1/1994 | Bohmer et al. |
| 5,278,272 A | 1/1994 | Lai et al. |
| 5,292,863 A | 3/1994 | Wang |
| 5,314,579 A | 5/1994 | Sung |
| 5,326,835 A | 7/1994 | Ahvenainen et al. |
| 5,371,158 A | 12/1994 | Brekner et al. |
| 5,387,659 A | 2/1995 | Hottovy et al. |
| 5,416,179 A | 5/1995 | Welch et al. |
| 5,455,314 A | 10/1995 | Burns et al. |
| 5,473,020 A | 12/1995 | Peifer et al. |
| 5,480,948 A | 1/1996 | Geerts |
| 5,492,985 A | 2/1996 | Peifer et al. |
| 5,533,437 A | 7/1996 | Howard et al. |
| 5,565,174 A | 10/1996 | Burns et al. |
| 5,565,175 A | 10/1996 | Hottovy et al. |
| 5,575,979 A | 11/1996 | Hanson |
| 5,597,892 A | 1/1997 | Hanson |
| 5,639,834 A | 6/1997 | Debras et al. |
| 5,712,365 A | 1/1998 | Arai et al. |
| 5,744,555 A | 4/1998 | Ames et al. |
| 5,747,407 A | 5/1998 | Martin |
| 5,898,053 A | 4/1999 | Leaney et al. |
| 5,959,044 A | 9/1999 | Villar |
| 5,986,021 A | 11/1999 | Hokkanen et al. |
| 6,042,790 A | 3/2000 | Hottovy et al. |
| 6,045,661 A | 4/2000 | Kreischer et al. |
| 6,204,344 B1 | 3/2001 | Kendrick et al. |
| 6,225,422 B1 | 5/2001 | Power et al. |
| 6,239,235 B1 | 5/2001 | Hottovy et al. |
| 6,281,300 B1 | 8/2001 | Kendrick |
| 6,319,997 B1 | 11/2001 | Kendrick et al. |
| 6,380,325 B1 | 4/2002 | Kendrick |
| 6,815,511 B2 | 11/2004 | Verser et al. |
| 6,818,186 B2 | 11/2004 | Burns et al. |
| 6,838,531 B2 | 1/2005 | Reid et al. |
| 6,908,971 B2 | 6/2005 | Burns et al. |
| 8,128,877 B2 | 3/2012 | McElvain et al. |
| 2001/0012497 A1 | 8/2001 | Debras |
| 2002/0086955 A1 | 7/2002 | Kendrick |
| 2002/0111441 A1 | 8/2002 | Kendrick et al. |
| 2002/0132936 A1 | 9/2002 | Kendrick et al. |
| 2002/0173598 A1 | 11/2002 | Kendrick et al. |
| 2002/0182121 A1 | 12/2002 | Kendrick |
| 2003/0229187 A1 | 12/2003 | Kufeld et al. |
| 2004/0024146 A1 | 2/2004 | Friedersdorf |
| 2004/0116625 A1 | 6/2004 | Hottovy et al. |
| 2004/0132928 A1 | 7/2004 | Hottovy et al. |
| 2004/0136881 A1 | 7/2004 | Verser et al. |
| 2004/0136882 A1 | 7/2004 | Verser et al. |
| 2004/0158007 A1 | 8/2004 | Hottovy et al. |
| 2005/0095176 A1 | 5/2005 | Hottovy |

FOREIGN PATENT DOCUMENTS

| | | |
|---|---|---|
| WO | WO 2004/007566 A1 | 1/2004 |
| WO | WO 2004/024311 A1 | 3/2004 |
| WO | WO 2005/044872 A1 | 5/2005 |

* cited by examiner

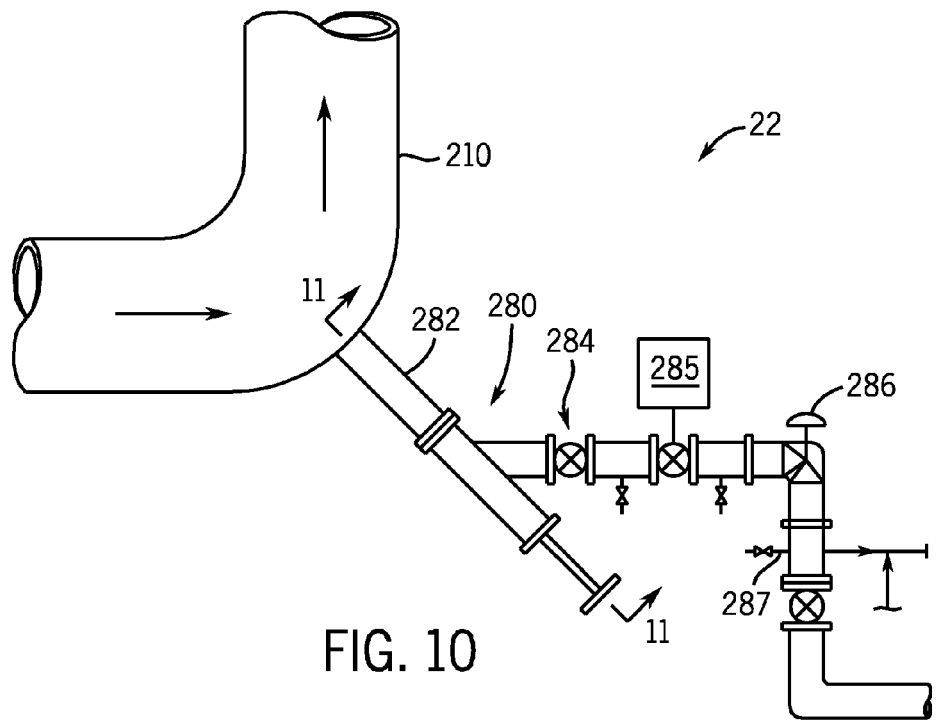
FIG. 10
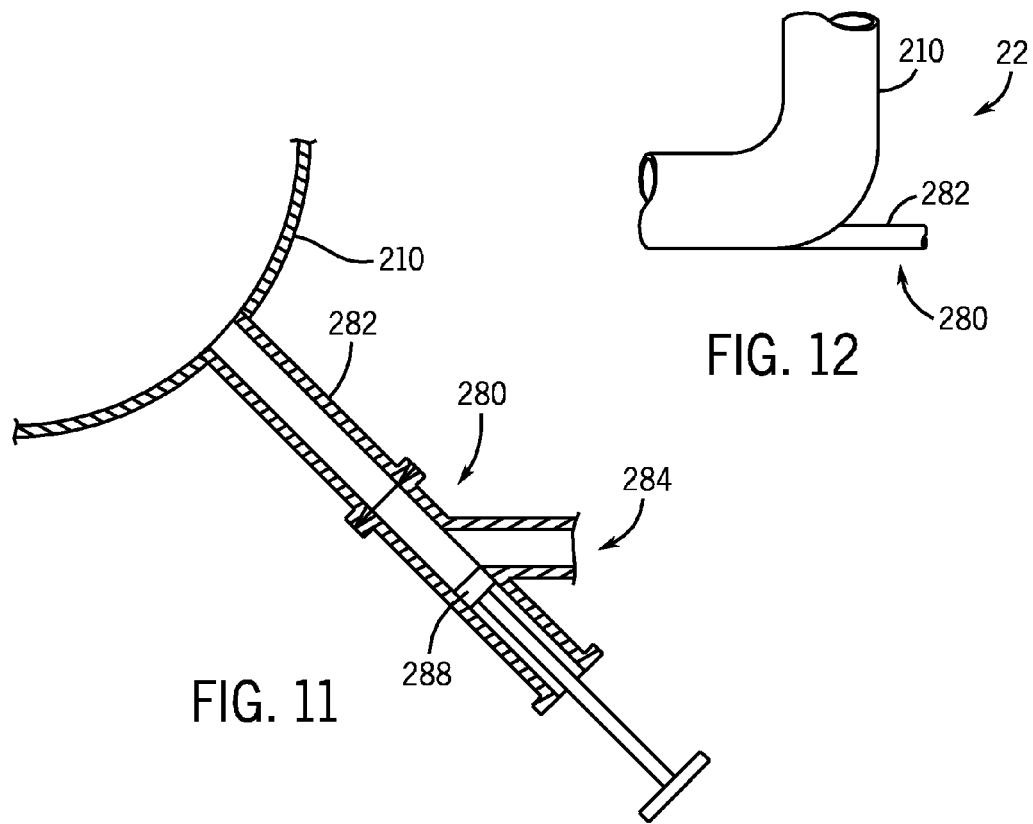
FIG. 11
FIG. 12

ENERGY EFFICIENT POLYOLEFIN PROCESS

RELATED APPLICATIONS

This application is a divisional of U.S. application Ser. No. 13/372,979, now U.S. Pat. No. 8,303,899, which is a continuation of U.S. application Ser. No. 13/207,262 filed Aug. 10, 2011, now U.S. Pat. No. 8,128,877, which is a divisional of U.S. application Ser. No. 11/213,374 filed Aug. 26, 2005, now U.S. Pat. No. 8,017,701, which claims priority to U.S. Application Ser. No. 60/604,948 filed on Aug. 27, 2004, the specifications of which are hereby incorporated by reference in their entirety.

BACKGROUND OF THE INVENTION

1. Field of the Invention

The present invention relates generally to polyolefin production and, more specifically, to techniques that increase the energy efficiency of polyolefin production processes.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed or near at petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a chromium oxide containing hexavalent chromium on a silica support. Further, a diluent may be introduced into the reactor. The diluent may be an inert hydrocarbon, such as isobutane, propane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent.

The discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system, to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

The competitive business of polyolefin production continuously drives manufacturers to improve their processes in order to lower production costs. In an industry where billions of pounds of polyolefin product are produced per year, small incremental improvements, for example, in catalyst activity, monomer yield, energy efficiency, diluent recovery, and so forth, can generate significant cost savings in the manufacture of polyolefins. Fortunately, technological advances over the years in raw materials, equipment design and operation, and the like, have provided great strides in reducing the capital, operating, and fixed costs of polyolefin manufacturing systems. For example, catalyst research has produced commercial catalysts with activity values that are orders of magnitudes higher than those of two to three decades ago, resulting in a striking reduction in the amount of catalyst consumed per pound of polymer produced, and also reducing the amount of downstream processing (and equipment) used to deactivate and/or remove residual catalyst in the polymer product. Further, advances in equipment design and operation have also increased diluent recovery so that less diluent make-up is utilized. Technological advances have also improved monomer yield, which is a measure of the conversion of monomer, such as ethylene or propylene, to a polymer or polyolefin, such as polyethylene or polypropylene. Additionally, advances have also increased energy efficiency in polyolefin manufacturing.

In general, the production of polyolefin is an energy-intensive process, consuming electricity, steam, fuel gas, and so on. A common way to measure energy consumption for a given technology or manufacturing process is in units of energy per mass of polyolefin produced. In a typical polyethylene plant, electrical consumption may be 460 kilowatt-hour per metric ton of polyethylene (kWh/ton PE) and higher. With steam, the consumption may be higher than 8 kilograms per metric ton of polyethylene (kg/ton PE) (an equivalent 320 kWh/ton PE). Likewise, fuel gas consumption for a typical polyolefin plant, such as a polyethylene plant, may be 8 kg/ton or higher. Again, such energy consumption generally contributes significant cost to the production of polyolefins, as well as to the downstream products constructed of polyolefins distributed to the customer.

A variety of equipment and operations within a polyolefin manufacturing process may consume energy. Noteworthy consumers of electricity within a polyolefin plant, for example, may include the pumps that circulate the liquid reaction mixture in the polymerization reactors (e.g., loop slurry reactors), the pumps that circulate the cooling medium (e.g., treated water) through the polymerization reactor jackets, the compressors that pressurize and return recycled diluent (and/or monomer) to the polymerization reactor, the blowers used to convey fluff and pellets, and the extruders that convert the polyolefin fluff to polyolefin pellets. Significant users of steam in a typical polyolefin plant may include heaters that flash liquid in the effluent of the polymerization reactor, and fractionation columns that process recovered diluent and/or monomer. Relatively large consumers of fuel gas may include activation processes (which may utilize high heat) of the polymerization catalyst, and operations that maintain adequate combustible content in the plant flare header (in the feed to the flare). In general, extensive energy is required to polymerize the monomer and comonomer to polyolefin fluff, to process recycled effluent from the reactor, and to convert the polyolefin fluff to pellets.

BRIEF DESCRIPTION OF THE DRAWINGS

Advantages of the invention may become apparent upon reading the following detailed description and upon reference to the drawings in which:

FIG. 10 is a diagrammatical representation of an exemplary continuous takeoff discharge of the polymerization reactor of FIG. 7 in accordance with one embodiment of the present techniques;

FIG. 11 is a cross section along line 11-11 of FIG. 10 showing a ram valve arrangement in the continuous take off discharge assembly in accordance with one embodiment of the present techniques;

FIG. 12 is a diagrammatical representation of a tangential location for the continuous take off assembly in accordance with one embodiment of the present techniques;

DETAILED DESCRIPTION OF SPECIFIC EMBODIMENTS

Figure 1:
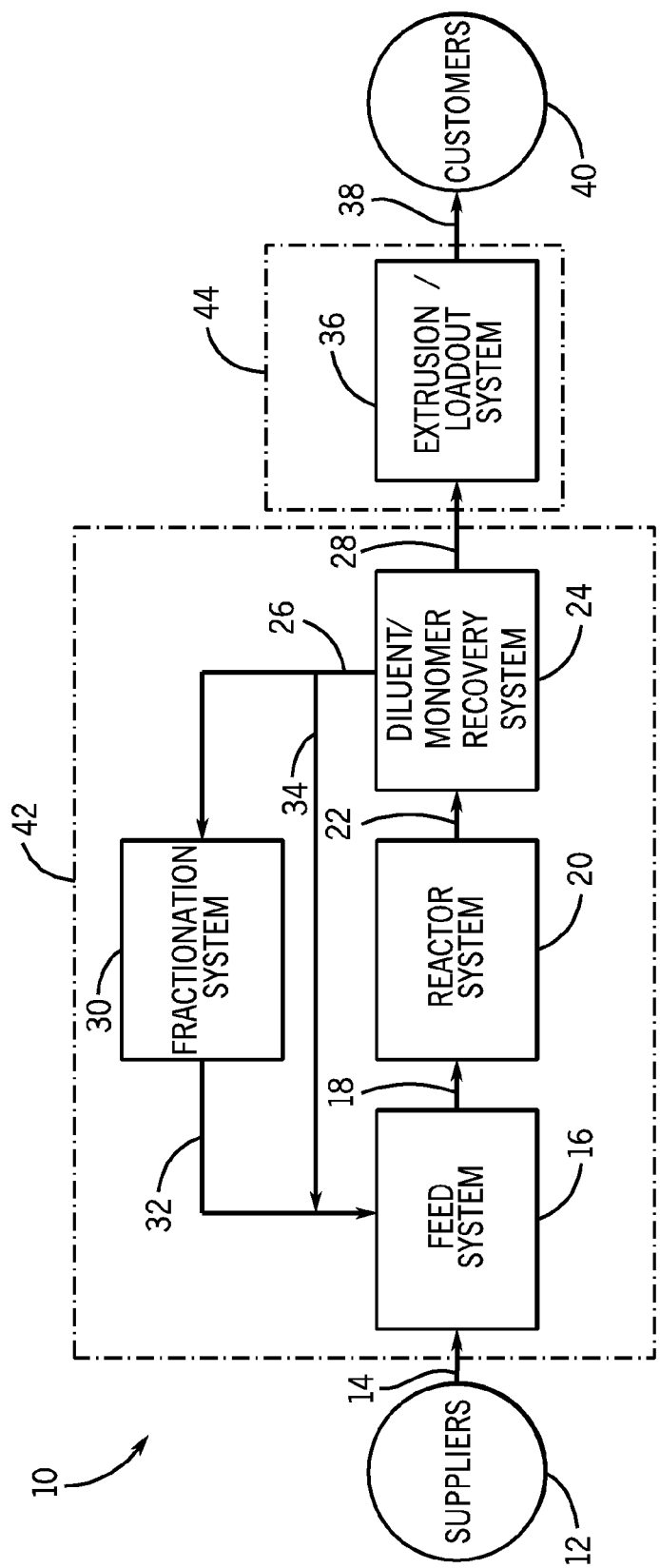
FIG. 1 is a block flow diagram depicting an exemplary polyolefin manufacturing system for producing polyolefins in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques increase energy efficiency in the manufacture of polyolefin, such as polyethylene or polypropylene. Such reductions in energy requirements may be accomplished, for example, by reducing processing steps, eliminating equipment, and using other techniques for improving efficiency. As discussed throughout the disclosure, examples of techniques that may enhance energy efficiency include reduction in the fractionation and compression of recycle diluent and other components, the combination of vessels into dual uses, and so forth. In general, such reduction of the energy required to produce a pound of polyolefin is beneficial for production facilities throughout the world, with increased benefits in parts of the world where energy is relatively expensive.

To facilitate discussion of the present techniques, the disclosure is presented in sections. Section I introduces examples of energy-efficient techniques in the polyolefin manufacturing process. Section II provides an overview of an exemplary polyolefin production process. Section III discusses the feed system for the polymerization reactor. Section IV discusses the polymerization reactor system. Section V discusses the diluent/monomer recovery system that may recover diluent and unreacted monomer from the effluent that discharges from the polymerization reactor. Section VI focuses on the cooling of the polymerization reactor. Section VII discussed the use of guide vanes in the reactor circulation pump to improve pumping efficiency and to increase polyolefin production rate. Section VIII discusses the implementation of a continuous takeoff for the polymerization reactor discharge. Section IX discusses an exemplary fractionation system that may process a large portion of the recycled diluent, or that may only treat a small portion to make available olefin-free diluent used in catalyst preparation. Section X discusses the extrusion/loadout system that converts the raw polyolefin particles to polyolefin pellets for distribution to the customer. Lastly, Section XI summarizes exemplary energy-efficient techniques. It should be noted that examples of the present techniques that provide for reducing energy consumption in the production of polyolefin are discussed throughout the disclosure. Furthermore, though the discussion at times may focus on the production of polyethylene and its copolymer, the disclosed techniques afford benefits in increased energy-efficiency in the production of other polyolefins, such as polypropylene, polybutylene, and so on. Finally, it should be apparent that the various techniques may be implemented in a multiplicity of combinations.

I. Introduction to Examples of Energy-Efficient Techniques

The present techniques provide for increased energy-efficiency in a wide range of operations in the polyolefin manufacturing process. Such operation include, for example, the reactor feed system, reactor system, diluent/monomer recovery system, fractionation system, and extrusion/loadout system. These energy-saving techniques are introduced in this Section and discussed in detail in Sections below.

A. Reactor Feed System

In the polymerization reactor feed system, for example, a mass flow meter, instead of the conventional orifice plate meter, is used to measure flow of monomer, eliminating preheating of the monomer. Further, a larger catalyst activator may be employed, reducing the amount of fuel gas consumed to activate the polymerization catalyst fed to the reactor. Additionally, the number of treaters that remove catalyst poisons from the reactor feed streams may be reduced, providing for more efficient regeneration of the treaters. Moreover, an improved technique of regenerating the treaters reduces the amount of inert components (e.g., nitrogen) discharged to the flare header. As a result, less fuel gas (e.g., natural gas) is injected into the flare header to maintain an appropriate combustible content of the feed to the flare.

B. Polymerization Reactor System

In the reactor system itself, a continuous take off (CTO) of the polyolefin slurry discharged from the polymerization reactor, in lieu of the conventional intermittent discharge employing settling legs, allows the reactor to operate with a higher solids concentration. A larger concentration of polyolefin in the reactor may afford a greater production rate of the polyolefin. In general, increases in production rate may reduce the normalized consumption of energy, in part, by spreading fixed energy costs over more pounds of polyolefin produced. Another benefit of the CTO discharge is that more polyolefin fine particles (relatively small particles) or "fines" may be removed from the reactor than with the conventional settling-leg configuration. Therefore, with less surface area of particles in the reactor, the fluid mixture operates at a lower viscosity facilitating circulation of the reactor contents and lowering horsepower requirements of the reactor circulation pump. Moreover, larger production rates can be achieved, for example, with 2-3 CTO's in normal operation for a single reactor, with 1-2 CTO's on standby. Further, each CTO may have a dedicated flash line heater. However, with the conventional settling leg configuration, as many as 12-14 would be used in operation to obtain the same production rates, with each settling leg having a dedicated flash line heater. Thus, with the CTO's, gives higher production rates of the polyolefin, but with lower steam usage.

Additionally, a liquid phase reactor, such as a loop slurry reactor, may be constructed of a material (e.g., high-strength aluminum) having higher strength and/or thermal conductivity than the steel materials traditionally utilized in fabrication of the loop slurry reactor. Such newer high-strength materials may provide for improved thinner reactor walls, increased heat-transfer through the walls, and a larger diameter of the loop reactor, permitting a higher polyolefin production rate. Yet another example in the reactor system is the use of guide vanes in the reactor circulation pump, providing for increased pumping efficiency (reduced electrical consumption) and increased polyolefin production rate. Lastly, another example is a technique that specifies a greater increase in the temperature (e.g., from the traditional 10° F. to the present 15-45° F. and higher) of the coolant flowing through the reactor jackets. Such increased temperature difference between the coolant supply and return imparts substantially the same heat removal capability but at lower flow rates of coolant. Therefore, the coolant circulating pump may be sized smaller, requiring less horsepower.

C. Diluent/Monomer Recovery System

In the diluent/monomer recovery system that processes the effluent discharged from the polymerization reactor, savings in electricity may be accomplished by eliminating a low-pressure flash of the diluent and the associated recycle compression. Further savings may be acquired by eliminating the purge column that removes residual hydrocarbon from the polyolefin fluff particles. The hydrocarbon removal operation instead may be performed at the downstream extruder feed tank in the extrusion/loadout system. This improvement allows for utilization of the process pressure in an upstream flash chamber, instead of a blower conveying system which consumes electricity, to transport the polyolefin particles to the extruder feed tank. The improvement also provides for warmer polyolefin fluff particles fed to the downstream extruder, thus reducing the energy load on the extruder.

D. Extrusion/Loadout System

Furthermore the number of polyolefin fluff silos intermediate the diluent/monomer recovery system and the extrusion/loadout system may be reduced in number via, in part, improved operation of the upstream polymerization reactor and the downstream extruder. Such reduction in silos or storage vessels may reduce the number of associated blowers and their electrical consumption. In the extrusion/loadout system, electricity may be saved via use of a pellet water pump to transport polyolefin pellets discharged from the extruder/pelletizer to the pellet silos instead of the conventional blower conveying package. Indeed, the horsepower requirement for the pellet water pump typically is an order of magnitude lower than that of a pneumatic conveying blower.

E. Fractionation System

In the fractionation system that processes the recovered unreacted monomer and diluent from the polymerization reactor and diluent/monomer recovery system, steam usage may be reduced by as much as 90 percent. Such reduction may be afforded by direct recycling of the diluent and monomer to the polymerization reactor and bypassing the fractionation system, thus allowing for smaller fractionation columns and smaller associated steam reboiler heat-exchangers.

F. Representation of Exemplary Results

Table 1 below shows examples of improved energy-efficiency with implementation of embodiments of some of the present techniques. Given in Table 1 are representative energy-consumption data for an exemplary polyethylene process technology utilizing a loop slurry reactor, a twin screw extruder, and the typical associated equipment. Consumption figures in electricity are given in kilowatt-hours of electricity consumed per metric ton of polyethylene produced. Consumption figures for steam are given in kilograms of steam consumed per metric ton of polyethylene produced. Lastly, fuel gas consumption is given in kilograms of fuel gas consumed per metric ton of polyethylene produced.

TABLE 1

Comparison of Energy Consumption

|  | Industry Avg. | Improved[1] | Improved[2] | Improved Avg. |
|---|---|---|---|---|
| Electricity, kW-h/ton | 458 | 325 | 350 | 338 |
| Steam, kg/ton | 312 | 144 | 148 | 146 |
| Fuel Gas, kg/ton | 7.6 | 2.8 | 6.5 | 4.7 |

[1]Determined August, 2004
[2]Determined August, 2005

An exemplary overall energy consumption number based on the combination of electricity, steam, and fuel gas is 445 kW-h/ton based on the first improved example. The steam (e.g., 165 pounds per square inch absolute) consumption may be expressed as 144 kg/mt×900 Btu/lb×lb/0.454 kg×0.000293 kw-hr/Btu=84 kw-h/mt. The fuel gas consumption (based on a combustible content of about 1,000 Btu per standard cubic feet) is 2.8 kg/mt×1000 Btu/scf×359 scf/lb-mol×lb-mol/18 lbs×lb/0.454 kg×0.000293 kw-hr/Btu=36 kw-h/mt. Therefore, the combined energy consumption is 325+84+36=445 kw-h/mt. Similarly, for the second improved example, steam consumption is 86 kw-h/mt and fuel gas consumption is 84 kw-h/mt. Therefore, for the second improved example, the combined energy consumption based on electricity, steam, and fuel gas is 350+86+84=520 kw-h/mt. Thus, for example 2, the electricity component is about ⅔ of the energy consumption, and steam and fuel gas are each about ⅙ of the energy consumption. The total energy average of the two examples is about 483 kw-h/mt.

Finally, it should be noted, as depicted in Table 2 below, that the present techniques provide for reduced usage of nitrogen and diluent (e.g., isobutane). Indeed, the present energy saving techniques offer significant savings in the consumption of nitrogen and diluent. For example, with less pneumatic conveying loops for the fluff and pellets, less nitrogen is used and lost. Another example is with a majority of the recovered diluent bypassing the fractionation system via "direct" recycle to the polymerization reactor, less diluent is loss. The exemplary consumption figures for nitrogen and diluent in Table 2 are given in normal cubic meters of nitrogen loss per metric ton of polyolefin produced, and in kilograms of isobutane diluent loss per metric ton of polyolefin produced, respectively.

TABLE II

Nitrogen and Diluent Losses

|  | Industry Average | Improved |
|---|---|---|
| Nitrogen, Nm3/ton | 76 | 26 |
| Isobutane, kg/ton | 13 | 1.7 |

II. Polyolefin Production Process—an Overview

In the production of polyolefin, the polymerization reactor(s), which polymerize monomer into polyolefin, and the extruder(s), which convert the polyolefin into polyolefin pellets, are typically continuous operations. However, a variety of both continuous and batch systems may be employed throughout the polyolefin process. An exemplary nominal capacity for a typical polyolefin plant is about 600-800 million pounds of polyolefin produced per year. Exemplary hourly design rates are approximately 85,000 to 90,000 pounds of polymerized polyolefin per hour, and 90,000 to 95,000 pounds of extruded polyolefin per hour. Again, in general, increases in production capacity may decrease the electrical consumption in kilowatt-hours (kW-h) per pound of polyolefin.

Turning now to the drawings, and referring initially to FIG. 1, a block diagram depicts an exemplary manufacturing process 10 for producing polyolefins, such as polyethylene homopolymer, polypropylene homopolymer, and/or their copolymers. Various suppliers 12 may provide reactor feedstocks 14 to the manufacturing system 10 via pipelines, trucks, cylinders, drums, and so forth. The suppliers 12 may comprise off-site and/or on-site facilities, including olefin plants, refineries, catalyst plants, and the like. Examples of possible feedstocks 14 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent. Moreover, improved techniques for regenerating the treatment beds, as explained below, reduce the amount of inert components (e.g., nitrogen) placed into the flare header and thus reduce the amount of fuel gas consumed by the flare.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks. In the catalyst area of the manufacturing process 10, an example of increased energy efficiency, as discussed below, is the use of a larger catalyst activator that consumes less fuel gas than the traditionally-sized activator. Furthermore, the larger activator may displace two or more smaller activators.

Further, the feed system 16 typically provides for metering and controlling the addition rate of the feedstocks 14 into the polymerization reactor to maintain the desired reactor stability and/or to achieve the desired polyolefin properties or production rate. In yet another example of increased energy efficiency, also discussed below, an improved technique for metering monomer (e.g., ethylene) flow to the polymerization reactor consumes less energy. Instead of the traditional flow orifice meter, which measures differential pressure across an orifice plate and which generally requires steam (or steam condensate) preheating of the monomer for accurate measurement, a mass meter (e.g., a Coriolis meter by MicroMotion, Inc. of Boulder, Colo.) may be used to measure ethylene flow. Mass meters typically do not require preheating of the ethylene monomer and, thus, save energy as compared to the traditional flow orifice meter.

Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20.

B. Reactor System

The reactor system 20 may comprise one or more reactor vessels, such as liquid-phase or gas-phase reactors. The reactor system 20 may also comprise a combination of liquid and gas-phase reactors. If multiple reactors comprise the reactor system 20, the reactors may be arranged in series, in parallel, or in any other suitable combination or configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties. Examples of increased energy efficiency via reduced electrical consumption in the reactor system 20, as presented below, is provided by improved techniques for cooling and discharging the polymerization mixture in the reactor.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support.

Further, diluent may be fed into the reactor, typically a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Some polymerization processes may not employ a separate diluent, such as in the case of selected polypropylene production where the propylene monomer itself may act as the diluent.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor. An example of a technique to save energy is the application of a motive force to the fluid medium in a loop slurry reactor via a single larger pump in lieu of two smaller pumps (in series), thus saving electrical costs.

C. Diluent/Monomer Recovery, Treatment, and Recycle

The discharge 22 of the reactors within system 20 may include the polymer fluff as well as non-polymer components, such as diluent, unreacted monomer/comonomer, and residual catalyst. The discharge 22 may be subsequently processed, such as by a diluent/monomer recovery system 24, to separate non-polymer components 26 (e.g., diluent and unreacted monomer) from the polymer fluff 28. In the diluent/monomer recovery system 24, increases in energy efficiency have been accomplished by decreasing electrical consumption via elimination of processing steps, such as with the elimination of a low-pressure recovery flash of the diluent/monomer and the associated recycle compression.

With or without the low pressure flash, the untreated recovered non-polymer components 26 may be further processed, such as by a fractionation system 30, to remove undesirable heavy and light components. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30, and thus avoiding the energy consumption of the fractionation system 30. Indeed, in certain embodiments, up to 80-95% of the diluent discharged from the reactor bypasses the fractionation system in route to the polymerization reactor. As a result, the size of the fractionation columns and associated steam consumption in the downstream fractionation system 30 may be reduced by as much as 70-90%.

As for the fluff 28, it may be further processed within the recovery system 24 and in the extrusion/loadout system 36, to prepare it for shipment, typically as pellets 38, to customers 40. Although not illustrated, polymer granules intermediate in the recovery system 24 and typically containing active residual catalyst may be returned to the reactor system 20 for further polymerization, such as in a different type of reactor or under different reaction conditions. The polymerization and diluent recovery portions of the polyolefin manufacturing process 10 may be called the "wet" end 42 or "reaction" side of the process 10, and the extrusion/loadout 36 portion of the polyolefin process 10 may be called the "dry" end 44 or "finishing" side of the polyolefin process 10.

Exemplary techniques directed toward increasing energy efficiency may include utilization of process pressure, instead of an electrical-mechanical motive force (e.g., blower or compressor), to transport or convey the polymer fluff 28 from the recovery system 24 to the extrusion/loadout system 36. Improved techniques may also include operation of the reactor system 20 to provide for more direct coupling in operation of the reactor system 20 and recovery system 24 to the extruder/loadout system 36. Such direct or "close" operative coupling may reduce the need for process residence time of the fluff 28. Thus, the number of intermediate fluff storage vessels (e.g., silos) and associated blower/compressor systems and electrical consumption may be reduced.

D. Extrusion/Loadout System

In the extrusion/loadout systems 36, the fluff 28 is typically extruded to produce polymer pellets 38 with the desired mechanical, physical, and melt characteristics. Extruder feed may comprise additives, such as UV inhibitors and peroxides, which are added to the fluff products 28 to impart desired characteristics to the extruded polymer pellets 32. An extruder/pelletizer receives the extruder feed, comprising one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer. An exemplary energy-saving technique includes the use of a pellet water pump (e.g., having a 15-50 horsepower motor) to transport the extruder pellets in the pellet water to the loadout area. This is contrast to traditional approach of employing a conventional conveying loop that typically uses a pellet blower operating at about 250-500 horsepower.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., USA.

E. Customers, Applications, and End-Uses

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 38 may be further processed and assembled for distribution and sale to the consumer. For example, a polyethylene milk bottle may be filled with milk for distribution to the consumer, or the fuel tank may be assembled into an automobile for distribution and sale to the consumer.

To form end-products or components from the pellets 38, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, portable water storage tanks, industrial waste containers, recreational equipment, marine products, plus many more.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

III. Polymerization Reactor Feed System

A. Monomer Feed

Figure 2:
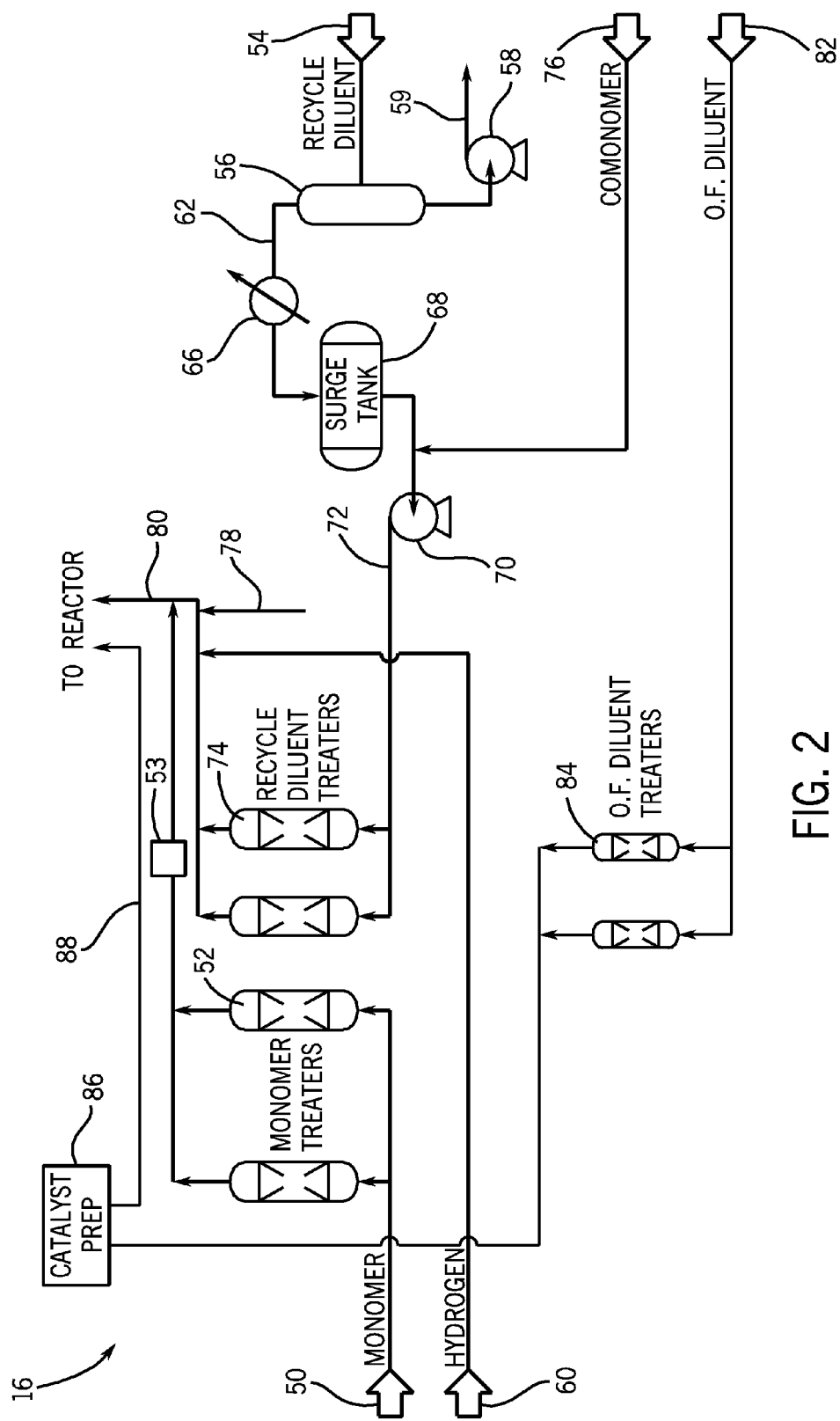
FIG. 2 is a process flow diagram of an exemplary feed system of the polyolefin manufacturing system of FIG. 1 in accordance with one embodiment of the present techniques.

Referring to FIG. 2, a process flow diagram of an exemplary reactor feed system 16 (of FIG. 1) is depicted. In this embodiment, monomer 50 (e.g., ethylene) is fed through monomer treaters 52 to the liquid phase reactor (e.g., loop slurry reactor) in the reactor system 20. Furthermore, a mass flow meter 53, instead of an orifice plate meter, may be used to measure the flow rate of ethylene to the reactor.

Indeed, the flow rate of ethylene monomer 50 to the reactor generally is typically measured (and controlled) to facilitate desired operating conditions (e.g., slurry density, comonomer/monomer ratio, production rate, etc.) in the reactor and to provide the desired properties of the polyethylene formed in the reactor. The exemplary mass flow meter 53 used to measure the ethylene monomer flow may be a Coriolis meter, for example. A Coriolis meter typically does not utilize preheating of the ethylene for accurate measurement of the ethylene flow rate. In contrast, as will be appreciated by those of ordinary skill in the art, an orifice plate meter generally utilizes preheating of the ethylene because the typical feedstock conditions of the ethylene may operate close to the critical point of ethylene (i.e., critical pressure and critical temperature). For example, with the orifice plate, the flow indication is typically inaccurate if the ethylene is operating close to its critical point because of the rapid change of fluid density near the critical point. In contrast, the Coriolis mass flow meter is tolerant of density changes or even phase changes because of its working principal, which measures mass instead of pressure, drop like the orifice plate (which is influenced by density or phase of the fluid). In addition to saving steam or steam condensate in not having to preheat the ethylene monomer feed, the avoidance of heating the ethylene results in cooler feed to the polyethylene reactor, and thus less heat needs to be removed from the reactor during polymerization, advancing further energy savings.

Coriolis flow meters are readily available and provide for low pressure drop, ease of installation, cleanability, and drainability. Accuracy for Coriolis meters is typically in the range of 0.05% to 0.4% with turndown ratios up to 200. Major suppliers of Coriolis mass meters include, for example: MicroMotion Company of Boulder, Colo.; Endress Hauser Company of Greenwood, Ind.; FMC/Direct Measurement Company, Longmont, Colo.; and Liquid Controls, Inc., of Lake Bluff, Ill.

B. Other Feed Streams

Recycle diluent 54 (e.g., isobutane) with a relatively small amount of entrained monomer may be returned from the diluent/monomer recovery system 24 (e.g., corresponding to stream 34 of FIG. 1) and sent to the polymerization reactor. In the example of "direct" recycle to the reactor, the recycled diluent 54 may be cooled and passed through a heavies knockout pot 56, where heavy components are removed out of a bottom discharge and sent via a centrifugal pump 58, for example, as feed 59 to the fractionation system 30. The overhead 62 of the knockout pot 56 may be further cooled in a heat exchanger 66 and collected in a recycle diluent surge tank 68 for feed to the reactor. Downstream, a centrifugal pump 70 may deliver the diluent 72 through recycle diluent treaters 74 to the loop slurry reactor. It should be noted that a relatively small amount of fresh diluent (not illustrated) may be added in the fractionation system 30, for example, to make-up for diluent losses in the manufacturing process 10. Furthermore, comonomer 76 (e.g., 1-hexene) may be added to the suction of pump 70 or at other points in the recycle diluent circuit for addition to the reactor. The monomer treaters 52 and recycle diluent treaters 58 may include molecular sieve or aluminum packing, for example, configured to remove catalyst poisons from the monomer, recycle diluent, comonomer feeds, and other feeds.

Other feed components may be added to the loop slurry reactor. For example, hydrogen 60 may be added to control the molecular weight of the polyolefin formed in the reactor. Furthermore, other additives, such as antistatic materials, may be injected into the reactor, as indicated by reference numeral 78. The various component streams may combine into a single feed stream 80 for feed to the loop slurry reactor. Further, as discussed below, diluent 82 that is substantially olefin-free may be recycled from the fractionation system 30 through treaters 84 for use in the preparation of the catalyst fed to the reactor. Indeed, diluent 82 may act as a carrier of the catalyst stream 88 discharged from the catalyst preparation system 86 in route to the loop slurry reactor.

C. Feed Treaters

Traditionally, up to 12-15 treaters have been employed to process the various feeds. For example, additional treaters have been utilized to remove poisons from the comonomer, fresh isobutane, and hydrogen. However, the total number of treaters may be reduced to six treaters, as illustrated in FIG. 2. This reduction in the number of treaters may be implemented by combining treatment of the fresh diluent with the recycle diluent, and using reactor grade hydrogen that is relatively free of poisons, and so on. Further, as illustrated, the monomer and diluent streams may each be configured with one treater and one spare treater, for a total of four treaters. Note that the illustrated six treaters may be further reduced to five treaters by sharing a spare treater between the monomer and diluent streams 50 and 72. Other configurations may employ even less treaters. In general, a reduction in the number of treaters reduces capital costs and saves energy by lowering electrical consumption due to more efficient scalability in regeneration (which typically uses electrical heat) of the treaters.

Moreover, an improved technique for regenerating the various treaters 52, 74, and 84, as well as other treaters, involves lessening the inert component load on the flare system to reduce fuel gas consumption. This may be accomplished by discharging regeneration nitrogen from the treaters to the atmosphere instead of to the flare header. In general, an inert component, such as nitrogen, is typically used to regenerate the various treaters. This nitrogen has traditionally been placed into the flare header, which increases the inert component load on the flare. As will be appreciated by those of ordinary skill in the art, the combustible content, i.e., the British Thermal Units (BTU's), of the feed to the flare is generally maintained at an acceptable minimum level to avoid adversely affecting operation of the flare. Therefore, to account for an increased concentration of inert components in the flare header (e.g., due to the injection of regeneration nitrogen into the header), fuel gas (e.g., natural gas) is added to the flare header. The present technique provides for discharging less of the nitrogen used for regeneration into the header, and thus reduces the consumption of fuel gas.

Figure 3:
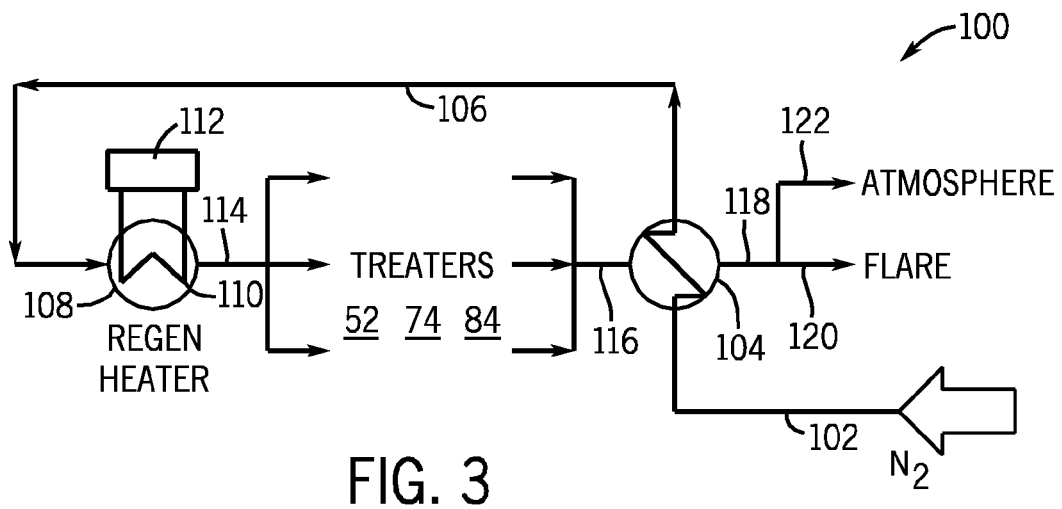
FIG. 3 is a process flow diagram of an exemplary treater regeneration circuit in accordance with one embodiment of the present techniques.

Referring to FIG. 3, a process flow diagram of a treater regeneration system 100 is depicted. Nitrogen 102 is passed through a cross-exchanger 104, where it is preheated by the hot nitrogen discharging from the treaters (e.g., 52, 74 and 84). The preheated nitrogen 106 then enters a regeneration heater 108, where an electrical element 110 heats the nitrogen via a controller 112. In general, the nitrogen 102 may be supplied from a main nitrogen header, for example, at nominally 150 pounds per square inch gauge (psig) and at ambient temperature. The nitrogen may be heated in the electric regeneration heater 110 up to about 600° F. for regeneration. The heated nitrogen 114 enters the treaters to regenerate the molecular sieve or desiccant. The hot nitrogen 116 containing the removed catalyst poisons from the treaters enters the cross exchanger 104, exiting as spent stream 118 which may be discharged to the flare 120.

On the other hand, clean nitrogen exiting during the subsequent cool-down of the treaters may discharge to the atmosphere 122. In general, the regeneration of the treaters occurs while the hot nitrogen is circulated through the treaters. Upon completion of regeneration, cool nitrogen is typically circulated through the treaters to cool the treater in preparation for normal operation.

Figure 4:
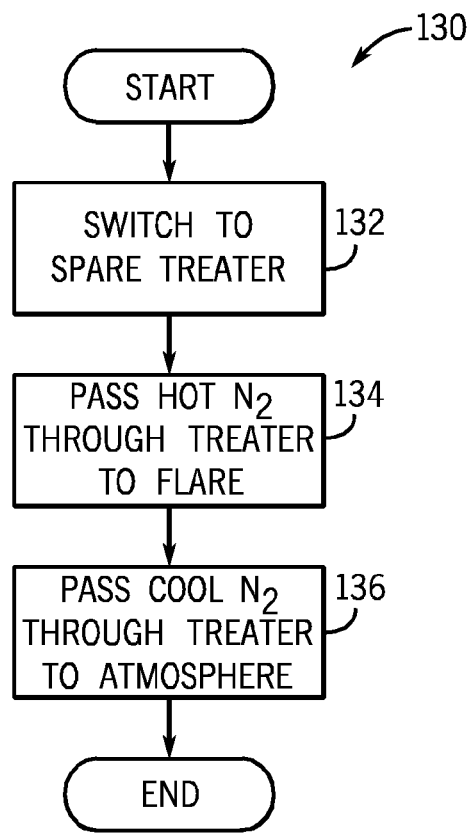
FIG. 4 is a block diagram of an exemplary method for regenerating a treater in accordance with one embodiment of the present techniques.

Referring to FIG. 4, a treater regeneration method 130 is depicted. Upon saturation of the molecular sieve packing with catalysts poison and other components, the various treaters may be regenerated. Initially, the process may take the saturated treater out of service and switch operation to the spare treater, as referenced in block 132. Hot nitrogen may be passed through the spent treater, and the hot nitrogen discharged to the flare (block 134). The amount of time hot nitrogen is passed through the treater may be influenced by a variety of factors, such as treater bed temperatures. In general, the hot regeneration is discontinued, and the treater prepared for cool down, when the bed outlet temperature reaches 450 to 500° F., and has been held at that temperature for at least two hours. Such procedures, however, may vary from plant to plant. Moreover, total regeneration time may depend also on the treater/bed size, regeneration heater capacity, nitrogen flow, weight, and the quality and thickness of the insulation surrounding the treaters, and so forth. In the example of an ethylene monomer treater 52 and/or a recycle diluent treater 74, the hot nitrogen may be passed through the heater for roughly about 18-30 hours.

Upon dissipation of the catalyst poisons from the treater bed via the hot nitrogen regeneration, the treater is prepared for cool-down. Cool nitrogen is passed through the treater to cool the treater prior to placing the treater back into operation (block 136). In the example of an ethylene monomer treater 54 and/or a recycled diluent treater 72, the cool-down time with nitrogen is about 8-16 hours. However, again, the timing of the cool down cycle may vary considerably from plant to plant. Traditionally, this clean nitrogen exiting the treater has been discharged to the flare header, as with the hot nitrogen. The present technique, however, provides for discharging the clean nitrogen to the atmosphere instead of to the flare header, and thus reduces the inert load on the flare. Thus, as discussed, fuel gas consumption is decreased.

D. Polymerization Catalyst

Figure 5:
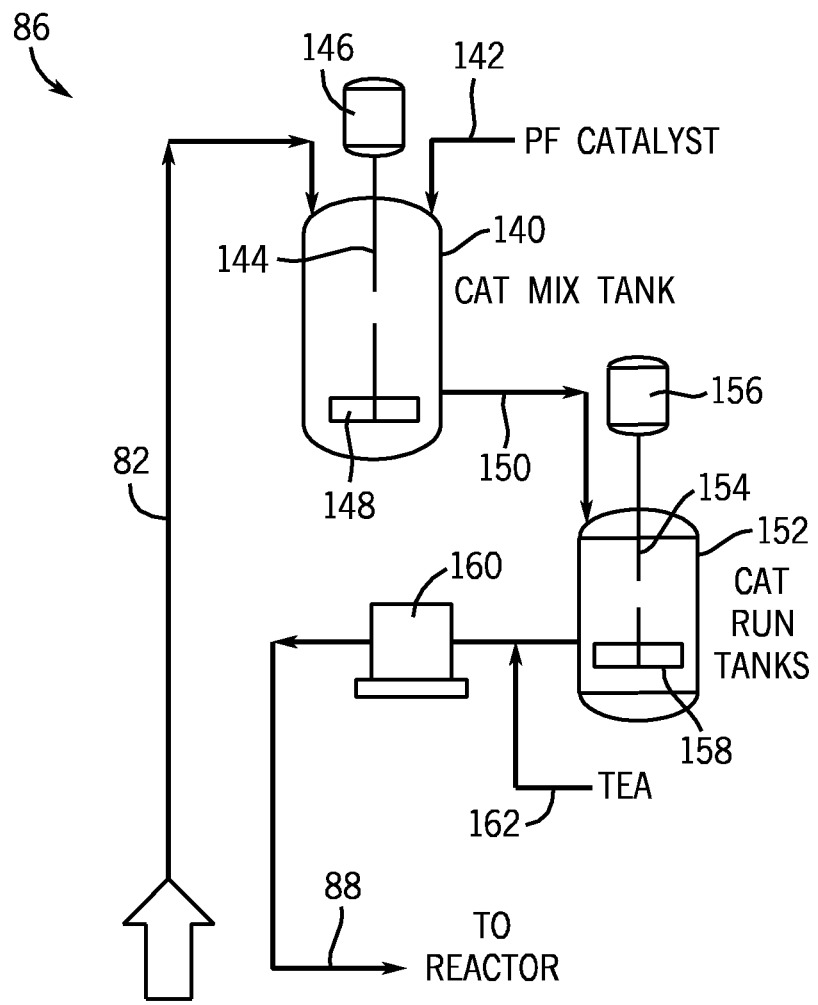
FIG. 5 is a process flow diagram of an exemplary catalyst preparation system of the feed system of FIG. 2 in accordance with one embodiment of the present techniques.

Referring to FIG. 5, a process flow diagram of the catalyst preparation area 86 is depicted. A catalyst mix tank 140 receives catalyst 142, for example, from a portable container. Olefin-free monomer 82 mixes with the catalyst in the catalyst mix tank 140. An agitator 144 having a motor and drive 146 and blade 148 may facilitate mixing of the diluent 82 and the catalyst 142 in the mix tank 140. The process catalyst 150 discharges from the mix tank 140 and may enter, for example, a catalyst run tank 152 for metering to the loop slurry reactor. The run tank 152 may also have an agitator 154 having a motor/drive 156 and agitator blade 158 to maintain the catalyst mixed with the diluent. The catalyst may be metered, for example, by a positive displacement pump 160 to the loop slurry reactor as feed stream 88. Additionally, additives, such as co-catalysts (e.g., triethylaluminum) 162, may be added to the catalyst 88 fed to the reactor. Finally, it should be noted that prior to mixing and metering the catalyst, the catalyst may be activated. For example, in the case of a chromium oxide catalyst, a catalyst activator may convert the chromium Cr3+ to Cr6+ for injection into the polymerization reactor. While in the reactor and in contact with the ethylene monomer, for example, the chromium Cr6+ may reduce to Cr2+.

Figure 6:
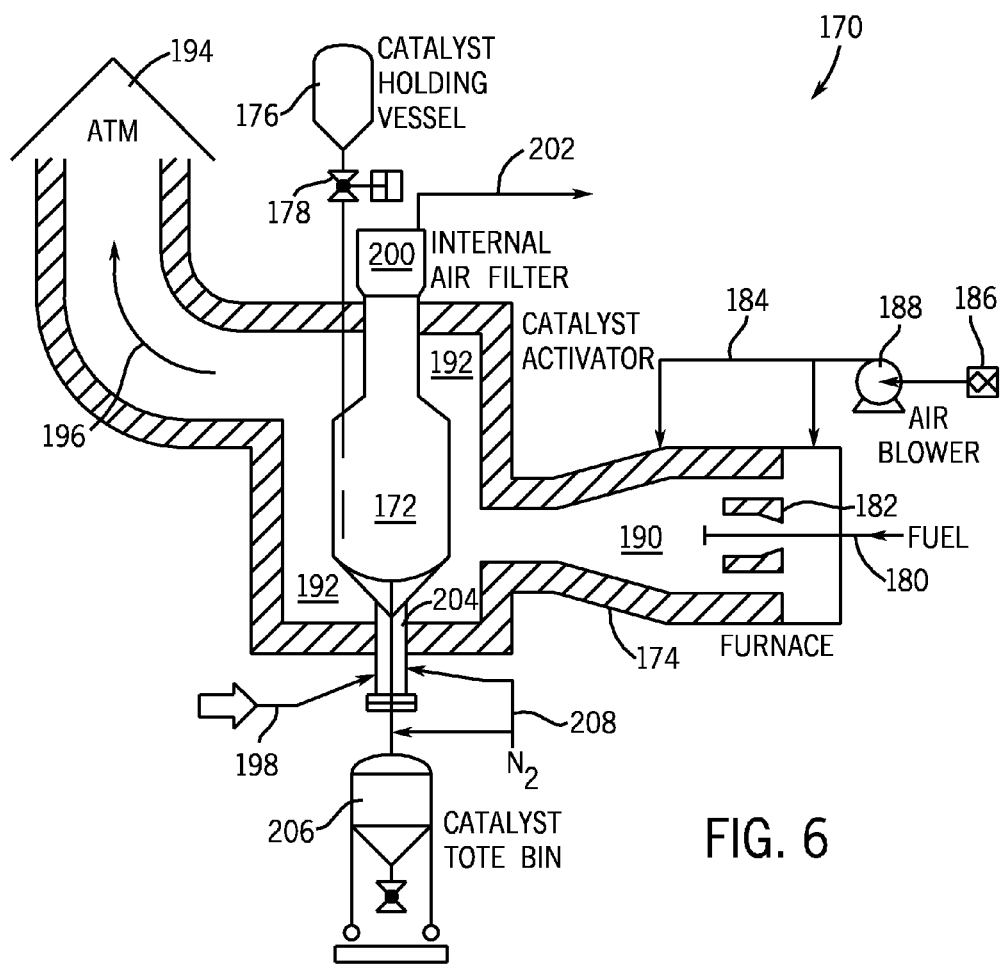
FIG. 6 is a process flow diagram of an exemplary catalyst activation system in accordance with one embodiment of the present techniques.

Referring to FIG. 6, a process flow diagram of a catalyst activator system 170 is depicted. The activated catalyst product of system 170 is fed to the catalyst mix tank 140 (catalyst 142) of FIG. 5. In FIG. 6, the catalyst activator includes an internal vessel 172 containing the catalyst, and an external furnace 174. Catalyst from the supplier may be held in a holding vessel 176 and fed via to the internal vessel via an on/off valve 178, for example. Fuel 180 may be added via a sparger or pilot 182, for example, into the furnace 180, and the fuel 180 may be combined with air 184 injected into the furnace via an air filter 186 and air blower 188. Combustion may take place inside the furnace in the region 190, for example. The region 192 surrounding the internal vessel 172 may experience operating temperatures in an exemplary range of 800 to 1700° F. The heated fluid from this region 192 may discharge to the atmosphere 194, as depicted by arrow 196.

In addition to high heat, oxygen may be supplied to activate the catalyst. Air 198 may be injected into the bottom of the internal vessel 172 to provide the presence of oxygen inside the vessel, with heat provided by the surrounding furnace 174. The air entering the vessel 172 may exit at the top via an internal air filter 200, for example, and then discharge to the atmosphere, as indicated by reference numeral 202. The activated catalyst may discharge from vessel 172 into a catalyst tote bin 206, or other container. Furthermore, nitrogen 208 may facilitate discharge of the activated catalyst into the tote bin 206, and also provide an inert atmosphere in the tote bin 206.

In general, catalyst activation processes include passing dry air through a catalyst bed at a constant rate, while applying heat, until the catalyst reaches the desired temperature, at which point the catalyst is held at the activation temperature for the proper length of time. A technique to improve the energy efficient of catalyst activation is to increase the diameter of the inner vessel 172. Conventionally, the nominal inner diameter of the vessel 172 has been about 42 inches or less. The present technique provides for increasing the nominal inner diameter (ID) of vessel 172 up to about 48-72 inches and greater. For the example of a 60 inch nominal ID, the catalyst throughput rate of catalyst may increased by 50-100%, while the fuel gas 180 consumed in the furnace remains essentially constant or slightly increases (i.e., less than 10% increase). Thus, the catalyst activation capacity is increased by 50-100%, while the furnace duty value remains at about the traditional 5 million BTU's per hour. The technique gives significant improvement in fuel gas efficiency in the manufacturing process 10. Indeed, in certain embodiments, the catalyst activation system 170 is generally the largest consumer of fuel gas in the polyolefin manufacturing process 10.

IV. Polymerization Reactor System

Figure 7:
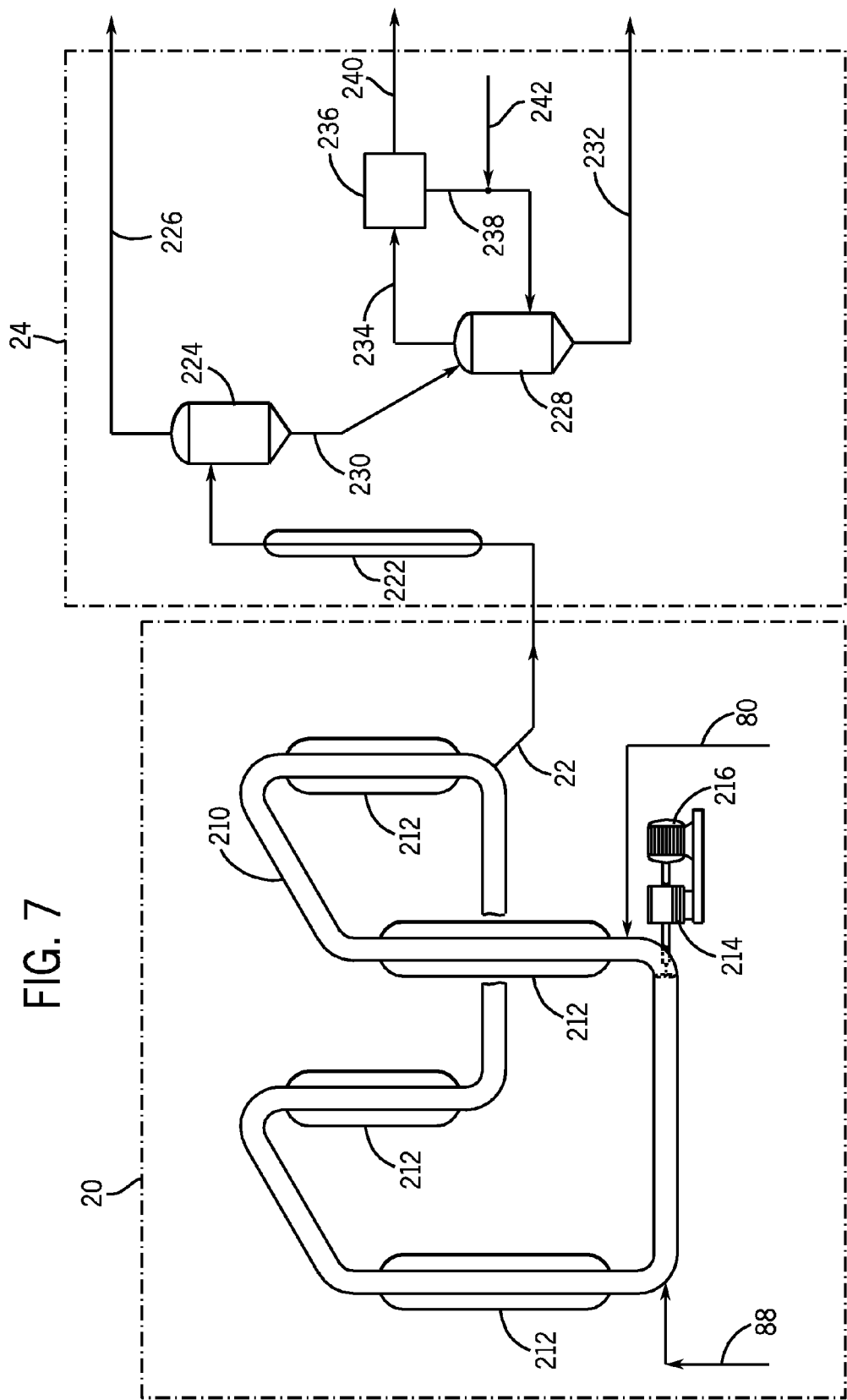
FIG. 7 is a process flow diagram of an exemplary reactor system and a diluent/monomer recovery system of the polyolefin manufacturing system of FIG. 1 in accordance with one embodiment of the present techniques.

Referring to FIG. 7, a process flow diagram of an exemplary polymerization reactor system 20 (of FIG. 1) and diluent/monomer recovery system 24 (also of FIG. 1) are depicted. As discussed above, the reactor system 20 may comprise one or more polymerization reactors, which may in turn be of the same or different types. Furthermore, in multiple reactor systems, the reactors may be arranged serially or in parallel. Whatever the reactor types comprising the reactor system 20, a polyolefin particulate product, generically referred to as "fluff" herein, is produced. To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present invention.

One reactor type comprises reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor 210 that produces polyolefin, such as polyethylene, polypropylene, and their copolymers, will be discussed in the context of the present techniques though it is to be understood that the present techniques are similarly applicable to other types of liquid phase reactors.

The loop slurry reactor 210 is generally composed of segments of pipe connected by smooth bends or elbows. An exemplary reactor 210 configuration includes eight jacketed vertical pipe legs, approximately 24 inches in diameter and approximately 200 feet in length, connected by pipe elbows at the top and bottom of the legs. As discussed below, reactor jackets 212 are normally provided to remove heat from the exothermic polymerization via circulation of a cooling medium, such as treated water, through the reactor jackets 212.

The reactor 210 may be used to carry out polyolefin polymerization under slurry conditions in which insoluble particles of polyolefin are formed in a fluid medium and are suspended as slurry until removed. A motive device, such as pump 214, circulates the fluid slurry in the reactor 210. An example of a pump 214 is an in-line axial flow pump with the pump impeller disposed within the interior of the reactor 210 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 216 or other motive force.

The fluid medium within the reactor 210 may include olefin monomers and comonomers, diluent, co-catalysts (e.g., alkyls, triethylboron, methyl aluminoxane, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 80, which generally corresponds to one of the feed streams 18 of FIG. 1. Likewise, a catalyst, such as those previously discussed, may be added to the reactor 210 via a conduit at a suitable location, such as depicted at feed stream 88, which may include a diluent carrier and which also generally corresponds to one of the feed streams 18 of FIG. 1. In total, the added components generally compose a fluid medium within the reactor 210 within which the catalyst is a suspended particle.

The reaction conditions, such as temperature, pressure, and reactant concentrations, are regulated to facilitate the desired properties and production rate of the polyolefin in the reactor, to control stability of the reactor, and the like. Temperature is typically maintained below that level at which the polymer product would go into solution. As indicated, due to the exothermic nature of the polymerization reaction, a cooling fluid may be circulated through jackets 212 around portions of the loop slurry reactor 210 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical. To reduce electrical consumption in the reactor system 20, a coolant pump that circulates the treated water through the jackets 212 may be reduced in size by lowering the flow rate of water (e.g., by half) and permitting a greater temperature increase $\Delta T$ of water (e.g., $\Delta T$ in the range of 15 to 45° F., instead of a typical 10° F.). Thus, in one embodiment, the horsepower of the coolant pump motor (see FIGS. 8 and 9) may be reduced by 30-70%.

As the polymerization reaction proceeds within the reactor 210, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 210 via a settling leg or other means, such as a continuous take-off, as depicted discharge stream 22. In downstream processing, the polyethylene discharged from the reactor may be extracted from the slurry and purified.

V. Diluent/Monomer Recovery System

A. Flash Chamber

The discharge 22 from the reactor 210 may flow through an in-line flash heater 222 and into a flash chamber 224. The in-line flash heater 222 may be a surrounding conduit that uses steam or steam condensate, for example, as a heating medium to provide indirect heating to the discharge 22. Thus, the loop slurry reactor 210 effluent (discharge 22) is heated prior to its introduction into the flash chamber 224. Also, before the discharge 22 enters the flash chamber 224, water or other catalysts poisons may be injected into the discharge 22 to deactivate any residual catalysts in the discharge 22 stream. Because these injected components are catalysts poisons by definition, they are typically completely removed, or at least substantially removed, from any recovered material (e.g., monomer or diluent) recycled to the reactor 210.

In the flash chamber 224, most of the non-solid components of the reactor discharge 22 are withdrawn overhead as vapor in the flash gas 226. Note, it is this recycled flash gas 226 that may bypass the fractionation system in route to the reactor 210 (i.e., via the feed system 16). In polyethylene production, this vapor is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent employed. In contrast heavy components or "heavies" may be defined as those components having higher boiling points than the diluent. An exemplary approximate composition of the flash gas 226 is 94 wt. % isobutane, 5 wt. % ethylene, and 1 wt. % other components. A level or volume of fluff may be maintained in the flash chamber 224 to give additional residence time of the fluff in the chamber 224 to facilitate separation of liquid and vapor entrained in the porous fluff particles.

The flash gas 226 may be processed in equipment such as cyclones, bag filters, etc., where entrained fluff solids are removed and returned to the flash chamber 224 or to downstream equipment, such as the purge column discussed below. The flash gas 226 may also travel through a deoxygenation bed, for example. Furthermore, the flash gas 226 may be cooled or condensed in a heat exchanger (e.g., shell-and-tube construction) prior to its recycle to the feed system 16 or fractionation system 30. To reduce steam consumption in the fractionation system 30, the flash gas 226 may bypass the fractionation system 30 and return more directly to the reactor 210 via the feed system 16.

As for the solids (polymer) in the flash chamber 224, they are withdrawn with a small amount of entrained diluent (and monomer) and sent to a purge column 228 via solids discharge 230. As will be appreciated by those of ordinary skill in the art, the solids discharge conduit may include valve configurations that allow polymer to flow downward through the conduit while reducing the potential for vapor to flow between the purge column 228 and the flash chamber 224. For example, one or more rotary or cycling valves may be disposed on the solids discharge conduit. Furthermore a relatively small fluff chamber may also be disposed on the conduit. Traditionally, the fluff solids from the flash chamber has discharged into a lower pressure flash chamber, with the lower pressure flash gas requiring compression for recycle to fractionation system 30 and reactor. However, the present techniques provide for elimination of a low pressure flash and the associated compression (a significant consumer of electricity), and discharge of the fluff solids from the flash chamber 224 to the purge column 228. Such a discharge to the purge column may include appropriate valve configurations, a surge chamber, or simply a conduit, and so on. Note that certain embodiments provide for a continuous fluff discharge from the flash chamber, which eliminates one or more relatively large cycling valves and the associated energy consumption.

B. Purge Column

The primary solids feed to the purge column 228 is typically the solids discharge 230 (polyolefin fluff) that exits the flash chamber 224. A purpose of the purge column 228 is to remove residual hydrocarbon from the entering solids streams and to provide substantially-clean polymer fluff 232. The fluff 232 may be transported or conveyed to the extrusion/loadout system 36 for conversion to pellets 38, and for distribution and sale as polyolefin pellet resin to customers 40. In general, the treated polymer particles discharged from purge column 228 as polymer fluff 232 may be processed in a conventional finishing operation, such as a screw extruder, in the extrusion/load out system 36 (FIG. 1).

In the exemplary purge column system illustrated, nitrogen is circulated through purge column 228 to remove residual hydrocarbons via overhead discharge 234. This discharge 234 may be sent through a separation unit 236, such as a membrane recovery unit, pressure swing adsorption unit, refrigeration unit, and so forth, to recover nitrogen via nitrogen stream 238, and to discharge a separated hydrocarbon stream 240 as feed to the fractionation system 30. In the art, the separation unit 236 may be known as an Isobutane Nitrogen Recovery Unit (INRU). Moreover, fresh nitrogen 242 may be added to the nitrogen circuit to account for nitrogen losses in the purge column 228 system. Finally, it should be noted that the hydrocarbon stream 240 may beneficially provide feed to the fractionation system 30 (see FIG. 13). For example, the hydrocarbon stream 240 discharging from the separation unit 236 makes available hydrocarbon feed that may be processed to give the olefin-free diluent used in catalyst preparation.

C. Alternate Configurations

As will be appreciated by those of ordinary skill in the art, a variety of configurations may be employed in the diluent/monomer recovery system 24. For example, the solids discharge 230 from the flash chamber 224 may be sent to another reactor (e.g., a gas phase reactor) instead of to the purge column 228 or to a low-pressure flash chamber. If discharged to another reactor, catalyst poison may not be injected upstream in the discharge 22, and, thus, residual active catalysts remain for further polymerization.

In another configuration, the purge column 228 may be eliminated from the recovery system 20 and combined with the downstream extruder feed tank. The separation unit 236 associated with the purge column 228 may be relocated to accommodate the extruder feed tank if desired. Thus, the high process pressure in the flash chamber 224 may be utilized to convey the fluff particles in solids discharge 230 to the extrusion/loadout system 36, eliminating a blower system (and associated electrical consumption) traditionally used to convey the fluff 232 to the extrusion/loadout system. Furthermore, heat in the fluff particles may be retained as the particles are not subjected to the typical cooling effect of nitrogen in a conventional, blower conveying loop. Thus, less heating of the fluff particles may be used in the downstream extruder feed system. Finally, the process pressure in the flash chamber 224 may be used to transport the fluff particles in a dense phase conveying arrangement, thus lowering the velocity of the flowing particles and reducing transport damage to the particles.

VI. Reactor Cooling

An improved technique for reactor cooling provides for a smaller coolant pump and associated motor, and thus a reduction in electrical consumption. To accomplish installation and operation of a smaller coolant pump (i.e., cooling water pump), the temperature of the cooling water through the reactor jackets is allowed to increase more than the conventional design specification of 10° F. Thus, the cooling water flow (and the size of the coolant pump) may be reduced.

A. Loop Slurry Reactor

Figure 8:
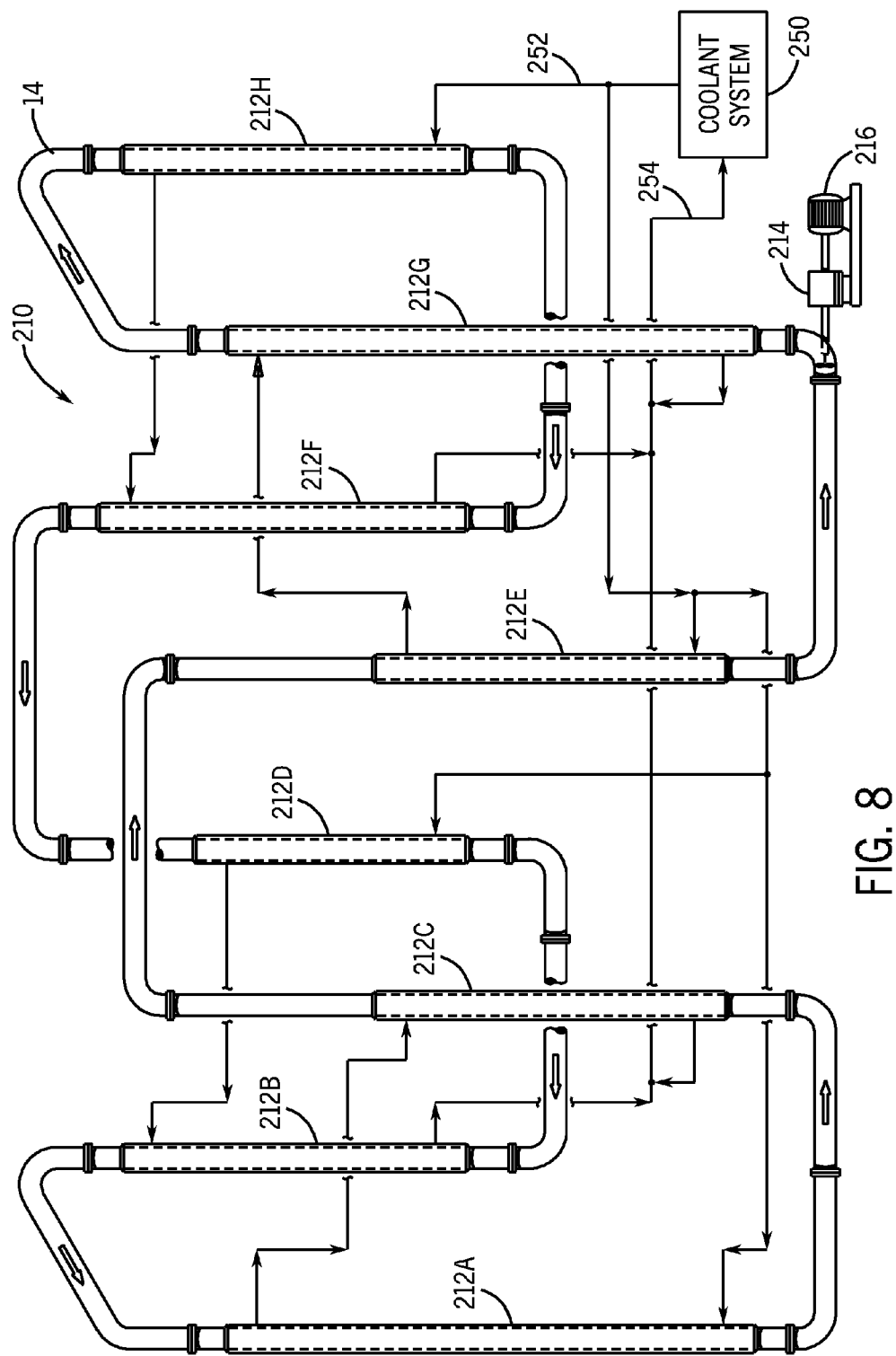
FIG. 8 is a diagrammatical representation of the exemplary polymerization reactor of FIG. 7 showing the flow of cooling medium through the reactor jackets in accordance with one embodiment of the present techniques.

FIG. 8 depicts an exemplary polymerization reactor 210 of FIG. 7 and shows a counter-current flow scheme of cooling medium through the reactor jackets 212A-H. Again, the loop reactor 210 is generally composed of segments of pipe connected by smooth bends or elbows. A motive device, such as pump 214, circulates the fluid slurry in the reactor 210. An example of a pump 214 is an in-line axial flow pump with the pump impeller disposed within the interior of the reactor 210. A coolant system 250 removes heat from the loop reactor 210 via reactor jackets 212A-H. The coolant system 250 provides a coolant supply 252 (e.g., treated water) and processes a coolant return 254.

As the polymerization reaction proceeds within the reactor 210, the reaction conditions may be controlled to facilitate the desired degree of polymerization and the desired reaction speed while keeping the temperature below that at which the polymer product would go into solution. As mentioned, due to the exothermic nature of the polymerization reaction, cooling jackets 212A-H may be provided around portions of the closed loop system through which a cooling fluid is circulated as needed to remove excess heat (heat of reaction), thereby maintaining the temperature within the desired range, generally between 150° F. to 250° F. (65° C. to 121° C.).

In general, reactor temperature varies linearly with changes in the reactor system operating conditions. An accepted assumption in the art is that heat generated in the reactor by the exothermic polymerization is linear with the polyolefin production rate (i.e., pounds per hour of polyolefin polymerized). Thus, reactor temperature, which is an indication of the energy or heat in the reactor, varies linearly with production rate. As appreciated by those of ordinary skill in the art, typical reactor temperature control may involve a proportional-integral-derivative (PID) algorithm.

B. Reactor Coolant System

Figure 9:
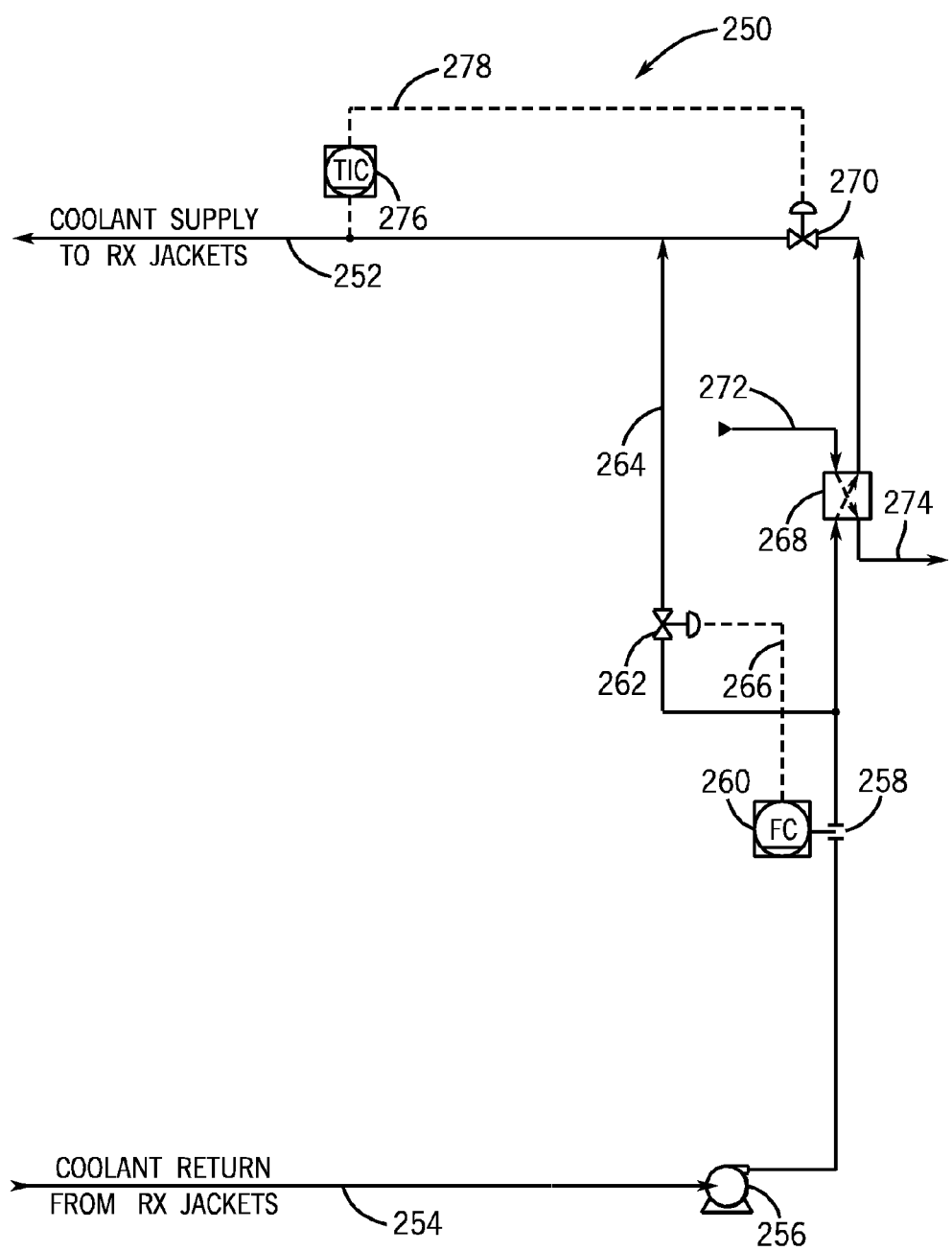
FIG. 9 is a process flow diagram of an exemplary coolant system used in the temperature control of the polymerization reactor of FIG. 8 in accordance with one embodiment of the present techniques.

Referring to FIG. 9, a process flow diagram of a coolant system 250 for the loop slurry reactor 210 of FIG. 8 is depicted. Coolant system 250 provides coolant supply 252 to reactor jackets 212A-H. Coolant system 250 receives coolant return 254 from reactor jackets 212A-H. A variety of coolants may be used to remove or add heat to the reactor system. In this illustrative embodiment, steam condensate (demineralized water) is used as the coolant. The coolant return 254 "carries" the heat removed from the reactor. The coolant system 250 transfers this heat to a utility cooling medium, such as to cooling tower water or sea water. The coolant system delivers "cooled" coolant supply 252 to the reactor jackets. Typical coolant supply 252 temperatures range from 105° F. to 150° F. and typical coolant return 254 temperatures range from 130° F. to 190° F.

Coolant flow through the coolant system 250 and through the reactor jackets 212A-H may be circulated, for example, by a centrifugal pump, as illustrated by coolant pump 256. An exemplary design basis of a coolant pump 256 is approximately 50 to 60 pounds per square inch (psi) delivered head at 3 to 12 million pounds per hour of coolant. An example configuration of the reactor jackets 212A-H (FIG. 8) is two counter-current double-pipe exchangers operated in parallel, with the inner pipe (the reactor) having an approximate 22 inch internal diameter, and the outer pipe (the jacket) having an approximate 28 inch internal diameter. In this example, the total heat transfer area of the reactor jackets 212A-H is about 5,000 square feet.

The coolant circulation may be a closed loop, hydraulically full system. A surge drum may be employed in the coolant circuit (i.e., at or near the suction of pump 256) to maintain the circuit liquid full and to reduce swings in pressure of the coolant system by compensating for hydraulic expansion caused by coolant temperature swings. Thus, pressure may be maintained substantially constant at the pump 256 suction by controlling level and pressure of the surge drum.

The total coolant circulation flow rate through the coolant system and the reactor jackets is typically maintained constant and may be measured at flow element 258. The flow element 258 may represent, for example, a flow orifice plate installed in the coolant piping. A control system may calculate the circulation flow rate based on the orifice size and the measured upstream and downstream pressures. The flow rate indication from flow element 258 may be received by flow controller 260, which may be a control block in a distributed control system (DCS). To maintain total constant flow, the output of flow controller 260, using control signal 266, may adjust the position of the valve 262 on a flow bypass line 264. A well-known example of a distributed control system in the art is the Honeywell TDC-3000 control system. Normally, it is desirable to minimize the movement of the valve 262 position to prevent cycling in the coolant pump 26. Thus, additional means at other points in the system may assist in maintaining the total coolant circulation flow rate constant.

During normal operation of a loop slurry reactor 210, heat is removed from the reactor contents, and heat is exchanged in cooler 268, which may represent one or more coolers. Heat is removed from the coolant in cooler 268 to cool the coolant supply 252 to the reactor jackets 212A-H. The cooler 250 may be, for example, a shell and tube heat exchanger or a plate and frame heat exchanger. A cooling medium, such as cooling tower water or sea water, flows through the cooler opposite the coolant, removing heat through the heat transfer surface area but not commingling with the coolant. The cooling medium flow is represented in this example by cooling water supply 272 and cooling water return 274. A cooling tower (not shown) may process the circulating cooling medium by removing heat from the cooling water return 272 and providing cooled cooling water supply 274. Thus, the cooling tower water removes heat from the coolant, which in turn removes heat from the reactor 210. In one example, the cooler 268 represents four plate and frame exchanger coolers that operate in parallel, each cooler having approximately 200 stainless steel (304) plates and approximately 1600 square feet of heat transfer surface, with the heat transfer coefficient varying from about 200 to over 800 Btu/hr/sq. ft/° F. as a function of coolant flow rate. Heat removed is about 15.5 million Btu/hr removed per cooler with a design pressure drop of approximately 3 psi on the coolant side. For the temperature control, coolant controller 276 (coolant temperature controller) maintains the temperature of the coolant supply to the reactor jacket. Coolant controller 276 sends an output signal 278 to adjust the positions of valve 270 (and potentially other valves).

C. Reduced Coolant Flow

As mentioned, the flow rate of coolant through the reactor jackets 212A-H may be reduced by allowing a greater temperature rise of the coolant. Traditionally, the temperature difference, $\Delta T$, between the coolant supply 252 and the coolant return 254 has been maintained at 10° F. In other words, the temperature of the coolant return 254 has been allowed to increase only to a temperature of about 10° F. greater than the temperature of the coolant supply 252. Currently, however, the temperature of the coolant return 254 is now allowed to increase greater than 10° F. (e.g., 15-45° F. and higher) than the temperature of the coolant supply 252. Thus, the cooling circuit may absorb the same or more amount of heat from the reactor 210 with less coolant flow through the reactor jackets. For the example of a $\Delta T$ of 20° F. relative to the customary $\Delta T$ of 10° F., the flow rate is cut in about half. Thus the size of the coolant pump 256 motor may reduced (e.g., from 1250 horsepower to 600 horsepower).

VIII. Guide Vanes for the Loop Reactor Pump

The present techniques provide for use of guide vanes in the loop reactor pump that circulates the contents of the reactor. Such use of guide vanes improves pump efficiency, reduces electrical consumption, and decrease normalized electrical usage by increasing polyolefin production rate. In addition to improved pump efficiency, implementation of the guide vanes improves several performance characteristics of the loop reactor and loop reactor pump. Gains occur, for example, in circulation rate, pump differential pressure, expected solids operating capability in the loop reactor, and as mentioned, the polyolefin production rate in the reactor, and so on. In the case of a 24-inch outer diameter (OD) loop reactor, use of guide vanes in the reactor pump may provide for polyolefin production in the range of 1.1 to 1.3 billion pound of polyolefin per year. Guide vanes may be employed in new installations or in the retrofit of existing loop reactor pumps to produce higher pump head and slurry velocity, which enables the higher solids level and residence time in the reactor. Increases in pump head may range, for example, from 5 to 25%.

Guide vanes may be utilized, for example, on loop pumps having a nominal OD in the range of 24 inches to 32 inches. Exemplary conditions of such pumps are 240-300 feet of heat at 35,000-40,000 gallons per minute (gpm) with a pumping efficiency improvement in the range of 1-4%. The guide vanes allow for a larger reactor having the same circulation rate as a smaller reactor. In the specific example of a 30 inch pump, the pump having guide vanes provides adequate circulation in a 45,000-55,000 gallon reactor. Other configurations for even larger increases in reactor volume may include larger pump diameters, use of two reactor pumps, or increasing the reactor diameter to shorten the reactor length, and so forth.

In general, three to six guide vanes may be employed, having a relative vane angle in the range of 0 to 30 degrees. As will be appreciated by those of ordinary skill in the art, the relative vane angle is the angle of the guide vane relative to the leading edge angle of the pump propeller. In other words, the relative vane angle is the difference in the average of the angle of the guide vane exit and lead angle of the pump blade relative to the plane of propeller rotation. A larger positive number of the relative vane angle generally means that the reactor slurry is rotated less by the preswirl guide vanes, while a smaller or negative number generally means that the slurry is rotated more. The direction of preswirl rotation of the slurry is in the opposite direction of the pump propeller rotation.

A typical guide vane may be welded to the wall of the reactor pipe upstream of the pump propeller. Placement of the guide vanes may be from 0.1 to 2 pipe diameters upstream of the pump propeller. The guide vanes may be positioned clear of the propeller hub and upstream of the reactor flange that connects to the pump suction. In this case, disassembly of the pump suction pipe may be facilitated where the guide vanes do not extend downstream of the flange.

In one example, the guide vanes start at about 24 inches in length, 6-7 inches tall, and 0.6-0.9 inches thick. The guide vanes may curved and bent so that the guide vanes are substantially parallel to the direction of flow and the discharge end is at the desired relative angle while following along the inside of the suction pipe of the pump. The upstream edge of the guide vanes may be sloped so that if debris or large polymer fragments (e.g., polymer "rope" or "strings") catches on the upstream edge, the debris or fragments may tend to advantageously slide to the center of the pipe and then be free of the guide vanes.

IX. Continuous Take Off of the Reactor Effluent Discharge

A. Configuration and Benefits

FIGS. 10-12 illustrate a continuous take-off mechanism of the reactor discharge 22. Referring to FIG. 10, a continuous takeoff mechanism 280 disposed on a pipe elbow of the loop slurry reactor 210, is depicted. The continuous takeoff mechanism 280 includes a take-off cylinder 282, a slurry withdrawal line 284, an emergency shut-off valve 285, proportional motor valve 286 to regulate flow, and a flush line 287. The reactor 210 may be operated "liquid" full, and because the reactor liquid contents are slightly compressible, pressure control of the liquid through the system may be accomplished with a valve. Further, where diluent input is held substantially constant, and the proportional motor valve 286 may be used to control the rate of continuous withdrawal and to maintain the total reactor pressure within designated set points.

Referring to FIG. 11, which is taken along section line 11-11 of FIG. 10, a smooth-curved pipe elbow having the continuous take-off mechanism 280, is depicted. Thus the illustrated pipe elbow may be considered am appendage-carrying elbow. As shown, the mechanism includes take-off cylinder 282, which is attached, in this instance, at a right angle to a tangent to the outer surface of the elbow. Further, coupling to the cylinder 282 is the slurry withdrawal line 284. Disposed within the take off cylinder 282 is a ram valve 288, which may serve at least two purposes. First, it may provide a clean-out mechanism for the take-off cylinder if it should ever become fouled with polymer, for example. Second, it may serve as a shut-off valve for the entire continuous take-off assembly.

FIG. 12 shows an attachment orientation for the take-off cylinder 282, which is affixed tangentially to the curvature of the elbow and at a point just prior to the slurry flow turning upward. The opening may be elliptical to the inside surface, for example, and further enlargement may be implemented to improve solids take-off. Finally, it should be noted that a variety of orientations of the attachment of the take-off cylinder 282 may be implemented.

A continuous take-off of product slurry of an olefin polymerization reaction carried out a loop reactor in the presence of an inert diluent allows operation of the reactor at a much higher solids concentration than with the conventional settling leg(s) used to discharge the polymer. For example, production of predominantly ethylene polymers (polyethylene) in isobutane diluent has generally been limited to a maximum solids concentration in the reactor of 37-40 weight percent (wt. %) with the settling leg configuration. However, the continuous take-off (CTO) has been found to allow significant increases in solids concentration. As a result, a solids concentration of greater than 50 wt. % in the reactor may be implemented with the continuous takeoff. It should be emphasized that in a commercial operation, as little as a one percentage point increase in solids concentration is of major significance. Such an increase, for example, allows higher production rates of polyethylene, and thus generally gives increased normalized energy efficiency. Furthermore, less liquid in the reactor discharge 22 may place less of a load on downstream recovery and fractionation systems 24 and 30, thus reducing downstream energy consumption. Additionally, this technique may present savings in electrical consumption because the continuous take-off discharge removes more fines from the reactor than the conventional discharge. With less surface area of particles in the reactor, the fluid mixture may operate at a lower viscosity, providing for easier circulation of the mixture through the reactor, and thus, less demanding pumping and associated horsepower requirements.

B. Polyolefin Particle Size

Furthermore, increasing the solids carrying capacity of the reactor also increases the capability to operate the reactor at higher space-time yield (e.g., a desired 2.6 or greater) as measured in pounds of polymer product produced per hour for each gallon of reactor volume or equivalent measures. Such an increase in the space-time yield in conjunction with a reduced incidence of reactor fouls may result in increased polyolefin production and throughput at the reactor 10.

To increase the solids carrying capacity of the reactor, it may be desirable to produce polymer particles in a desired size range such that the polymer particles are more likely to remain suspended, thereby allowing a greater weight percentage of solids to be achieved in the reactor. For example, an Englehard Lynx 100 catalyst, which on average produces smaller polymer particles than those produced using a Davidson 969 MS Chrome catalyst, may be used to achieve a higher solids level in a reactor without inducing a foul. In this example, the polymer particles produced by the Lynx 100 catalyst may be circulated at higher solids levels than comparable polymer particles produced by the 969 MS catalyst.

The desired size range may vary depending on the polymer product and reaction conditions. In one embodiment, to maintain suitable slurry conditions in a loop slurry reactor running under reaction conditions such as those discussed with regard to FIG. 1, less than 1% by weight of the polymer particles are greater than $1,500\mu$, across. In another embodiment, less than 5% by weight of the polymer particles are greater than $1000\mu$, across. In yet another embodiment, for less than 0.1% by weight of the polymer particles are greater than $1,500\mu$, across and/or for less than 0.5% by weight of the polymer particles are greater than $1000\mu$, across At the other extreme, to avoid problems associated with excessive numbers of fine particles, in one embodiment, less than 5% by weight of the polymer particles are less than $100\mu$ across and, in another embodiment, less than 0.5% by weight of the polymer particles are less than $100\mu$ across. Furthermore, in yet another embodiment, more than 70% by weight of the polymer particles are between $300\mu$ and $500\mu$ across and, in an additional embodiment, more than 80% by weight of the polymer particles are between $300\mu$ and $500\mu$ across. In yet another embodiment, more than 90% by weight of the polymer particles are between $300\mu$ and $500\mu$ across.

Production of polymer particles having size distributions in accordance with these preferences may be accomplished by a variety of techniques. For example, a catalyst may be employed which, due to the catalyst size, shape, reactive surface area, or other catalyst activity characteristic, produces polymer particles in the desired size range. In particular, the size of the polymer particles produced by a catalyst generally varies proportionally with the catalyst particle size; that is, smaller catalysts generally produce smaller polymer particles. The weight percentage of different sized polymer particles may vary between catalysts and generally corresponds to the catalyst particle size. For instance, a $25\mu$ EP30X catalyst does not produce measurable amounts of the polymer particles larger than $1190\mu$, unlike the larger catalysts. Similarly, the catalysts smaller than $100\mu$ produce less than 5% by weight of polymer particles greater than $1,000\mu$ across while $100\mu$ catalysts produce more than 5% by weight of polymer particles greater than $1,000\mu$ across. While catalyst size may be one factor that determines polymer particle size, other factors, such as morphology, active site accessibility, and so forth, may also contribute to the range of polymer particle sizes produced by a given catalyst.

X. Fractionation System

A. Diluent Purification

A purpose of the fractionation system 30 in polyolefin production is to purify the diluent discharged from the reactor system (e.g., from loop slurry reactor 210) and which is flashed/recovered in the diluent/monomer recovery subsystem 24. Initially, however, it should be noted, again, that the flashed diluent from the diluent/monomer recovery system 24 may instead be condensed and passed through a treater, such as a molecular sieve system, and directly recycled to the loop slurry reactor 210, bypassing the fractionation system 30. The treater may remove undesirable components, such as the catalyst poison (e.g., water) injected upstream of the high pressure flash chamber 44 in the reactor discharge 22.

On the other hand, some or all of the recovered diluent from the diluent/monomer recovery system 24 may be sent through fractionation columns in the fractionation system 30 to remove heavy components, such as hexene, hexane, and oligomers. The columns may also remove light components, such as ethane that enters with the ethylene feedstock, nitrogen from the purge column 228, unreacted ethylene from the reactor 210, and so forth. In one arrangement, the fractionation subsystem initially removes heavy components in a heavies column (also called diluent recycle column, recycle isobutane column, and the like) and then removes lighter components in a subsequent lights column (also called diluent purification column, isobutane purification column, and the like).

B. Heavies Column

To remove heavy components, the first column (heavies column or diluent recycle column) may discharge heavy components (e.g., hexene, hexane, and oligomers) out the bottom of the column to the flare. In certain configurations, the first column may also produce a side stream of diluent product (e.g., isobutane) that typically contains a measurable amount of light components (e.g., ethylene) but is acceptably recycled to the loop slurry reactor 210. In older configurations, this diluent product stream recycled to the reactor 210 may comprise the bulk of the recovered diluent received by the fractionation system 30 from the diluent/monomer recovery subsystem 24. The first column may also produce an overhead lights stream comprising primarily diluent, inert components, and ethylene, which may be partially condensed. Non-condensed components (e.g., nitrogen, ethylene) may be flared or recycled to the supplier, or may be vented as feed to the downstream second (lights) column. Condensed components of the overhead stream may be used as reflux to the first column and as reflux or feed to the second column, depending on the configuration employed at the particular polyolefin facility.

C. Lights Column

To remove light components, the second column (lights or diluent purification column), removes light components (e.g., ethylene, ethane, and nitrogen) to give a more pure diluent product, which may be substantially olefin-free (with the heavy components already removed in the upstream column). The second column typically processes a smaller amount of diluent than the first column. The small stream of monomer-free (olefin-free) diluent may exit the bottom of the second column and be used in catalyst preparation, catalyst delivery, catalyst flushes, reactor flushes where catalyst is present, and so forth. The availability of monomer-free diluent is beneficial for these catalyst-related functions because it may be important that olefin monomer not come into contact with catalyst outside of the reactor 210. Such contact could result in polymerization in undesirable parts of the process, which may plug equipment, cause operability problems, expend catalyst, and so forth.

D. Fractionation System Equipment and Process

Figure 13:
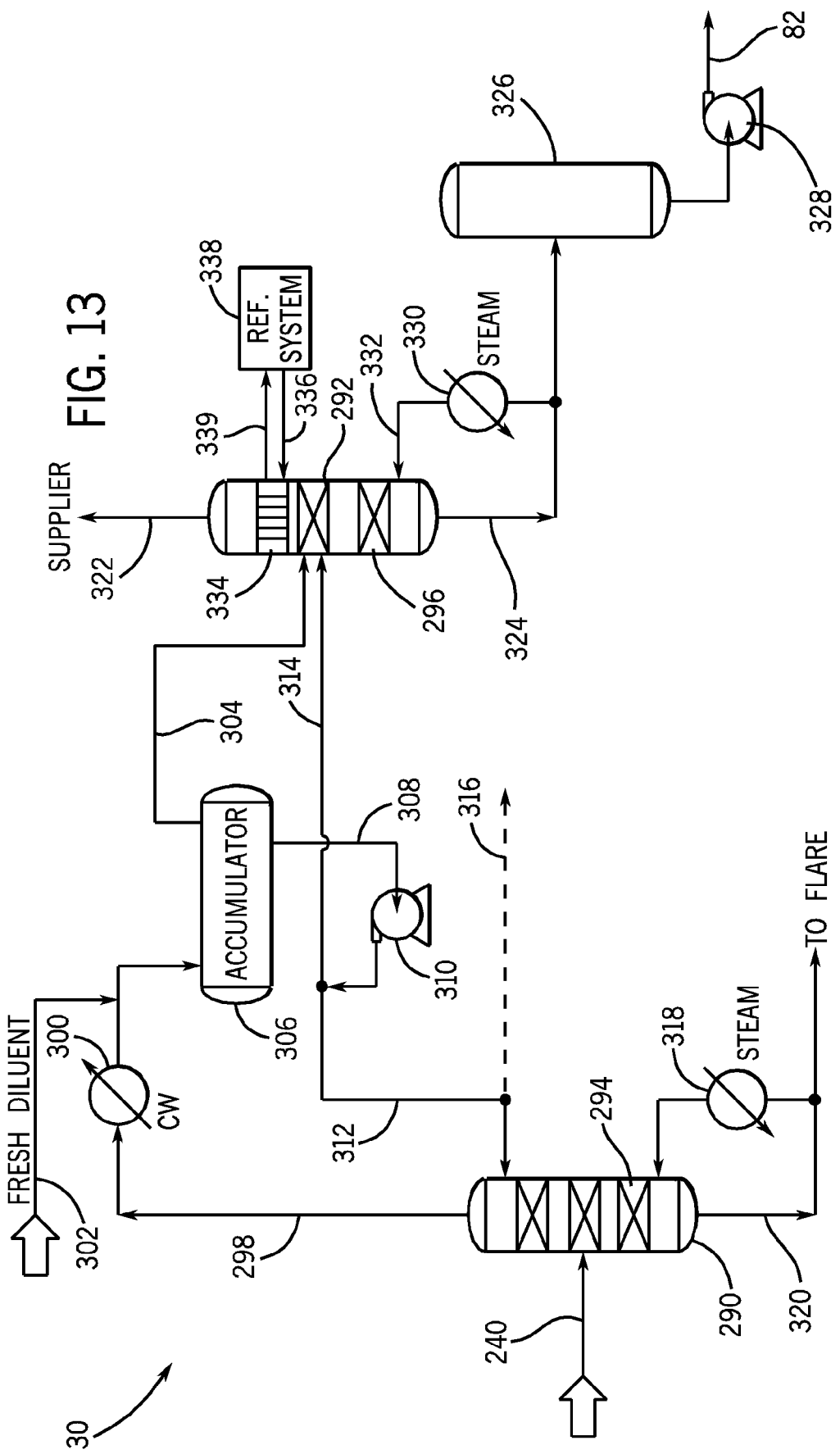
FIG. 13 is a process flow diagram of the fractionation system of FIG. 1 in accordance with one embodiment of the present techniques.

Referring to FIG. 13, a process flow diagram of the fractionation system 30 is depicted. The heavies column 290 and the lights column 292, each having appropriate internals 294 and 296 (e.g., packing, distillation trays, etc.), are illustrated. A flash gas stream, or in this illustration, the hydrocarbon stream 240 (primarily diluent) from the purge column 228 is fed to the lights column 290, which may operate typically at a pressure in the range of 125-175 psig and at a temperature in the range of 140-350° F. The lights column 290 separates unreacted monomer (e.g., ethylene) and lighter components (e.g., ethane, propane, nitrogen, etc.) in the overhead, as well as the heavier components such as hexane-1 and oligomers, from the diluent (e.g., isobutane) in the bottoms discharge. The overhead 298 from column 290 may be partially condensed in a condenser 300, such as a heat exchanger that utilizes a cooling medium (e.g., cooling tower water). Furthermore, it should be noted that fresh diluent 302 may be added to the circuit downstream of the condenser 300.

The uncondensed vapors 304 may be separated in the accumulator 306 and fed to the lights column 292. In an alternate configuration, all or a portion of the vapors 304 may be vented to upstream supplier operations (e.g., olefin plant, petroleum refinery, etc.) or to the flare. The condensed liquid 308 from the accumulator 306 may be returned via pump 310 as reflux 312 to the heavies column 290. The liquid 308 may also be sent as reflux or feed 314 to the downstream lights column 292. Furthermore, the liquid 308, which is typically primarily diluent, may be recycled to the reactor 210, as indicated by reference numeral 316 (e.g., via a storage vessel and pump). Lastly, a steam reboiler 318 (e.g., shell and tube heat exchanger) vaporizes the heavy components 320 (e.g., hexene and oligomers) discharging from the bottom column 290, with a portion of the components 320 discharged to the flare.

The lights column 292 may receive condensed components 314 and uncondensed components 304, and separate a light component stream 322 (e.g., nitrogen, ethane, ethylene) for recycle to the supplier, or as a vent to the flare. At the bottom of the column 292, "olefin-free" diluent 324, which is substantially free of olefin monomer, discharges from the column 292 and may be collected in an olefin-free diluent tank 326, for example. The olefin-free diluent 82 may then be delivered via pump 328 (e.g., centrifugal pump, positive displacement pump, etc.) for reactor flushes and catalyst dilution (see FIG. 2). A steam reboiler 330 vaporizes a portion of the liquid diluent 324 discharging from the bottom of the lights column 292 to provide a return vapor flow 332 to the column 292. Furthermore, column 292 may be refluxed by a refrigerated condenser 334, with refrigerant 336 supplied from a refrigeration system 338. In the illustrated embodiment, the refrigeration system 338 also processes the refrigerant return 339. An exemplary refrigerant used is liquid propylene. The overhead operating temperature of the column 292 in one example, is in the range −10° F. to 0° F., and the bottoms operating temperature is in the range of 145 to 170° F.

Finally, as discussed, with direct recycle of 80 to 95 wt. % of the diluent and unreacted monomer recovered from the in the monomer/recovery system 24 to the feed and reactor systems 16 and 20. For example, flash gas 226 (FIG. 7) which discharges from the flash chamber 224 overhead, and which generally corresponds to the recycle stream 34 of FIG. 1, may be sent as the recycle diluent 54 stream (FIG. 2) directly to the reactor 210 via the surge tank 68. Such direct recycle significantly reduces the load on the fractionation system, including the load on the heavies column 290 and lights column 92. Thus, these columns (and similar fractionation columns) and associated steam reboilers 318 and 330 may be significantly reduced in size (e.g., 5-20% of the conventional size) for the same capacity polyolefin plant. Thus steam usage is significantly reduced and substantial energy is saved by employing smaller columns.

IX. Extrusion/Loadout System

Figure 14:
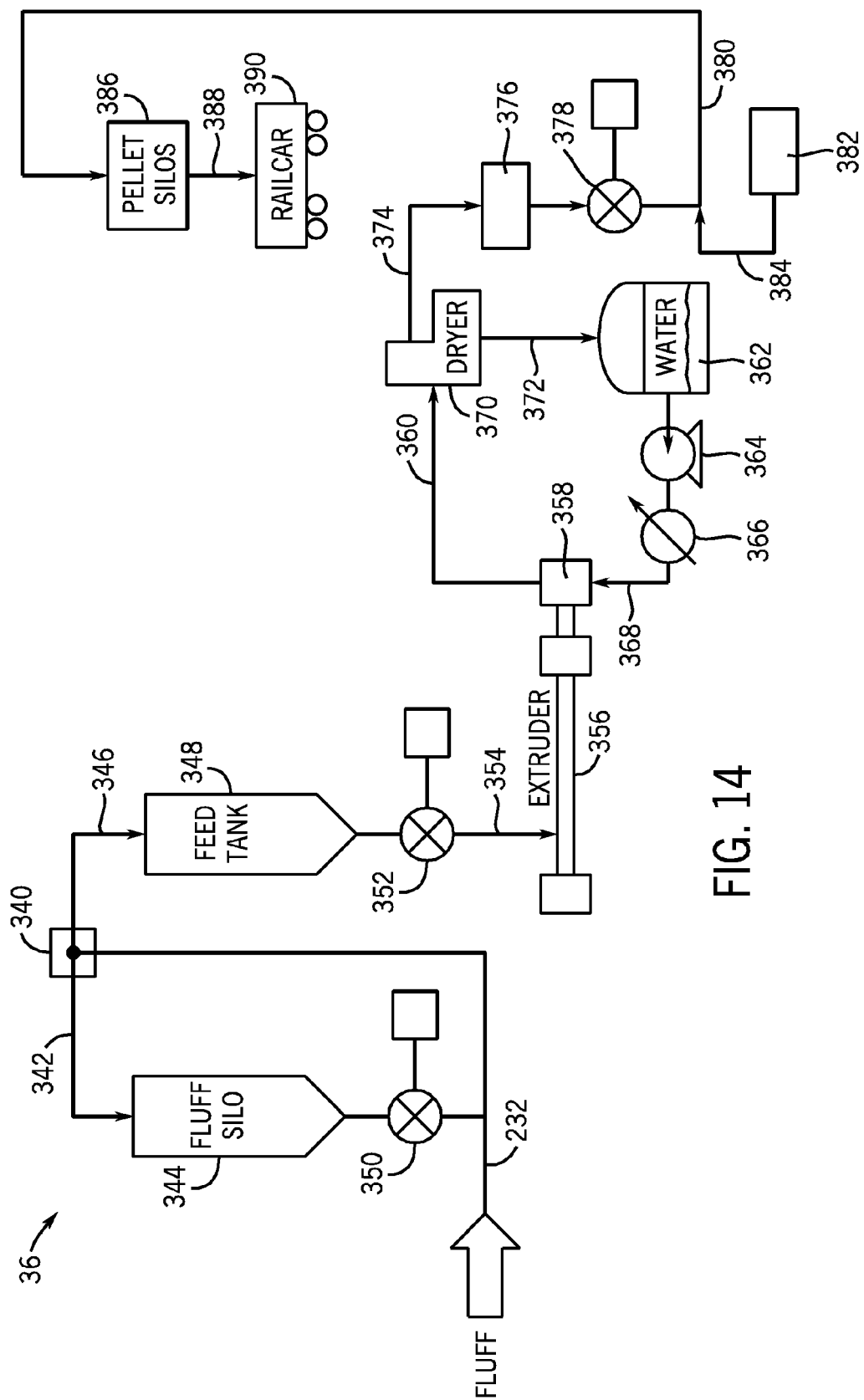
FIG. 14 is a process flow diagram of the extrusion/loadout system of FIG. 1 in accordance with one embodiment of the present techniques.

Referring to FIG. 14, a process flow diagram of the extrusion/loadout system 36 of FIG. 1 is depicted. Polyolefin fluff 232 from the purge column 228 (FIG. 7) may be pneumatically transferred, for example, using a dilute phase blower, through a valve 340 in the extruder/loadout system 36, and either into conduit 342 to the fluff silo 344, or into conduit 346 to the extruder feed tank 348. The fluff silo 344 may be used to provide surge capacity during shutdown of the extruder (or of other operations) in the extrusion/loadout system 36. On the other hand, the fluff silo 344 may also accumulate fluff to allow for full-rate operation of the extruder while the upstream polymerization reactor 210 "catches up" during start up of the reactor 210. The polyolefin fluff in silo 344 may be pneumatically transferred to the extruder feed tank through rotary valve 350 with the aid of a blower system.

Typically, however, the primary flow of polyolefin fluff 232 (which may generally correspond to fluff 28 of FIG. 1) is to the extruder feed tank 348 via conduit 346. Downstream, rotary valve 352 may feed polyolefin fluff 354 to the extruder 356, where the extruder heats, melts, and pressurizes the polyolefin fluff 354. As will be appreciated by those of ordinary skill in the art, the fluff 354 from the extruder feed tank 348 may be metered to the extruder 356 with a variety of meters, such as a smart flowmeter-type, master-feeder type, and so forth. Furthermore, additives may be injected into the fluff 354 stream at an addition rate that may be based on a specified ratio to the mass flow rate of the fluff 354. This ratio or "slave" feed of additives to fluff 354 may be specified at a value to generate a desired recipe, for example, for each polyolefin grade or product, and to give the desired properties of the downstream polyolefin pellets. Furthermore, the additive addition may be accomplished with a liquid additive system, loss-in-weight-feeders, and the like. In certain embodiments, one or more lost-in-weight feeders may be used to meter a pre-mixed additive package fed from a bulk container, for example, from an extruder feed hopper to the extruder 356 via the fluff 354 stream, and so on.

In general, the extruder 356 may melt, homogenize, and pump the polyolefin polymer and additives through a pelletizer 358, which may include a screen pack and heated die head, for example, which pelletizes the mixture of fluff and additives. Further, pelletizer knife blades (i.e., under water) may cut the polyolefin melt extruded through the die into pellets. The pellets are typically quenched by water 368 and may travel in a pellet-water slurry 360 from the pelletizer 358 to a pellet dewatering dryer 370. The dryer 370 may separate the free water 3720 and then dry the remaining surface water from the pellets by centrifugal force. The dried pellets 374 may discharge onto a scalping screen 376, for example, which removes oversized and undersized pellets from on-specification pellets.

Water 368 may be supplied to the pelletizer 358 from a water tank 362 via a centrifugal pump 364 and cooler 366 (e.g., shell and tube heat exchanger). Water 372 removed from the pellet dryer 370 may return to the water tank 362. The polyolefin pellets exiting the scalping screen 376 may fall by gravity through a rotary valve 378 into a dense-phase pneumatic conveying line 380, for example, and transported to pellet silos 386. The pellet silos 386 may include storage tanks, blenders, off-specification storage tanks, and so on. In the illustrated embodiment, the blower package 382 provides nitrogen and/or air 384 to convey the pellets via conveying line 380 to the pellet silos 386. Polyolefin pellets 388 may be loaded into rail cars 390, hopper cars, trucks, tote bins, bags, and so on. Pellets 388 may be loaded into hopper cars, for example, using a gravity type, air assisted, multiple-spout, loading system. Such a system may allow the hopper car to be automatically loaded at a rate higher than the polymerization and extrusion production rate. Thus, extra "time" generated by the higher loadout rates may be exploited to provide time to move the hopper cars or rail cars after filling, and to spot the next empty car.

A variety of energy proficient techniques may be implemented in the extrusion/loadout system 36. For example, as previously discussed, the upstream purge column 228 may be combined with the extruder feed tank 348. Thus, the conveying system for transporting fluff 232, and thus the associated electrical consumption of the blower in the conveying system, may be eliminated. Furthermore, in this example, the fluff 232 is warmer (e.g., 450° F.) than if experiencing the cooling effect (e.g., cooled down to 80-100° F.) of nitrogen or air in a conveying system customarily implemented. With combining the purge column 228 into the extruder feed tank 348, the fluff 232 (becomes the fluff 354) and is fed to the extruder warmer than traditionally fed to the extruder 356. Therefore, less steam is consumed at the extruder to heat and melt the incoming fluff 354.

In general, the number of silos or storage vessels between the diluent/monomer recovery system 24 and the extrusion/loadout system 36 may be reduced. In the illustrated embodiment, two vessels are depicted, a fluff silo 344 and an extruder feed tank 348. Traditionally, however, up to 10 to 15 storage vessels and associated blower conveying and recycling/blending systems have been provided to store, blend, and feed fluff to the extruder 356. Thus, in the illustrated embodiment, less electricity is consumed relative to traditional operation of fluff storage and feed.

Furthermore, the last remaining fluff silo 344 may be eliminated and thus, the associated blower package 351 and electrical consumption may be eliminated. To do away with the fluff silo 344 and to give up the associated fluff residence time, the wet end 42 may be more closely coupled in operation with the dry end 44 (see FIG. 1). In other words, improved techniques may be implemented in the operation of the polymerization reactor 210 in reactor system 20 (FIG. 1) to allow the reactor 210 to "back off" on production rate of polyolefin fluff, for example, to accommodate upsets in the downstream extrusion/loadout system 36 that normally may be accommodated by the surge capacity of a fluff silo 344. For example, if the extruder 356 is shut down temporarily, the polymerization reactor 210 may be subjected to a "mini-kill" or a "partial-kill," where a relatively small portion (e.g., part per billion range) of catalyst poison, such as carbon monoxide, is injected into the reactor 210 to temporarily "kill" the polymerization. Thus, if a temporary shut down of the extruder 356 or other equipment in the extrusion/loadout system 36 occurs, the discharge of polyolefin fluff 232 is temporarily stopped or reduced from the reactor 210 discharge 22 due to lack of polymerization in the reactor 210. Therefore, the residence time in the extruder feed tank 348 may be adequate to retain the incoming fluff 232 until the extruder operation is restarted.

Finally, it should be noted that yet another blower conveying package may be eliminated in the extrusion/loadout system 36, and thus providing for additional reduction in electrical consumption. The pellet water pump 364 may be used to convey the pellets 374 into the pellet silos 384, and thus, the blower package system 382 may be eliminated. The electrical consumption is significantly reduced because the typical size of the pellet water pump motor is only 25 horsepower, compared to a horsepower rating of the blower motor ranging from 250 to 500 horsepower and higher. It should be noted that if pellet water pump 364 is used to convey the pellet water slurry 360 up to above the silos 386, the pellet dryer 364 and scalping screen 376 may be relocated above the silos 386, and thus allow for gravity-draining of the pellets 374 from the dyer 370 through the scalper 376 into the pellet silos 386.

X. Summary of Energy-Efficient Techniques

Some of the energy-efficiency techniques are itemized below.

A. In the polymerization reactor feed system, a mass flow meter, instead of the conventional orifice plate meter, is used to measure flow of monomer, eliminating the need to preheat the monomer.

B. Further, a larger catalyst activator is employed, reducing the amount of fuel gas consumed (combusted) to activate the polymerization catalyst fed to the reactor.

C. Additionally, the number of treaters that remove catalyst poisons from the reactor feed streams are reduced, providing for more efficient scalability in regeneration of the treaters and lower electrical consumption.

D. Moreover, an improved regeneration technique of the treaters reduces the amount of inert components (e.g., nitrogen) discharged to the flare header. This reduces the amount of fuel gas (e.g., natural gas) injected into the flare header to maintain an appropriate combustible content of the feed to the flare.

E. In the reactor system itself, a continuous take off (CTO) of the polyolefin slurry discharged from the reactor, instead of the conventional intermittent discharge via a settling leg, provides for a higher solids concentration in the reactor. A larger concentration of polyolefin in the reactor may permit a greater production rate of the polyolefin and thus reduce the normalized consumption of energy, in part, by spreading fixed energy costs over more pounds of polyolefin produced. Furthermore, a continuous take-off discharge removes more fines from the reactor than the conventional settling-leg discharges, and thus with less surface area of particles in the reactor, the fluid mixture operates at a lower viscosity providing for easier circulation of the reactor contents. Therefore, the reactor circulation pump may be downsized, utilizing less horsepower.

F. Additionally, a liquid phase reactor, such as a loop slurry reactor, may be constructed of a material (e.g., high-strength aluminum) having higher strength and thermal conductivity that than steel, the traditional material used in the fabrication of the loop slurry reactor. Such newer high-strength materials provide for improved thinner reactor walls, improved heat-transfer through the walls, and increased diameter of the loop reactor, permitting a higher polyolefin production rate.

G. Another example in the reactor system is the use of guide vanes in the reactor circulation pump, providing for increased pumping efficiency (reduced electrical consumption) and increased polyolefin production rate.

H. Yet another example in the reactor system is a technique that specifies a greater increase in the temperature (e.g., from the traditional 10° F. to 15-45° F. and higher) of the coolant flowing through the reactor jackets. Such increased temperature difference between the coolant supply and return imparts the same heat removal capability at lower flow rates of coolant. Therefore, the coolant circulating pump may be sized lower, requiring less horsepower.

I. In the diluent/monomer recovery system that processes the effluent discharged from the polymerization reactor, savings in electricity are accomplished by eliminating a low-pressure flash of the diluent and the associated recycle compression.

J. Further savings may be acquired by eliminating the purge column that removes residual hydrocarbon from the polyolefin fluff particles. The hydrocarbon removal operation is instead performed at the downstream extruder feed tank in the extrusion/loadout system. This improvement allows for utilization of the process pressure in an upstream flash chamber, instead of a blower conveying system that consumes electricity, to transport the polyolefin particles to the extruder feed tank. The improvement also provides for warmer polyolefin fluff particles (e.g., 450° F. versus 80-100° F. of the fluff in the conventional conveying system) fed to the downstream extruder, reducing the energy load on the extruder.

K. Furthermore the number of polyolefin fluff silos intermediate the diluent/monomer recovery system and the extrusion/loadout system are reduced in number via, in part, improved operation of the upstream polymerization reactor and the downstream extruder. Such reduction in silos or storage vessels reduced the number of associated blowers and their electrical consumption.

L. In the extrusion/loadout system, electricity is saved via use of a pellet water pump is to transport polyolefin pellets discharging the extruder/pelletizer to the pellet silos instead of the conventional blower conveying package. Indeed, the horsepower requirement for the pellet water pump is an order of magnitude lower than that of a pneumatic conveying blower.

M. In the fractionation system that processes the recovered unreacted monomer and diluent from the polymerization reactor and diluent/monomer recovery system, steam usage is reduced by as much as 90 percent. Such reduction is afforded by direct recycle of the diluent and monomer to the polymerization reactor, bypassing the fractionation system, and thus allowing for smaller fractionation columns and the associated steam reboiler heat-exchangers.

What is claimed is:

1. A method for operating a polyolefin manufacturing process, comprising:
   polymerizing a monomer in a polymerization reactor to produce a slurry comprising polyolefin particles and diluent;
   separating a majority of the diluent from the polyolefin particles of the slurry in a flash chamber to produce a flash stream comprising separated diluent, and a solids stream comprising the polyolefin particles and residual diluent;
   purging the solids stream in a purge column to generate a discharge stream comprising the residual diluent, and to generate a fluff stream comprising the polyolefin particles, wherein the purge column receives the solids stream directly from the flash chamber;
   feeding the discharge stream from the purge column to a fractionation system;
   extruding the polyolefin particles of the fluff stream in an extruder to form extruded polyolefin; and
   pelletizing the extruded polyolefin in a pelletizer to produce polyolefin pellets.

2. The method of claim 1, comprising consuming less than approximately 325 kilowatt-hours of electricity per metric ton of polyolefin pellets produced.

3. The method of claim 1, comprising consuming less than approximately 144 kilograms of steam per metric ton of polyolefin pellets produced.

4. The method of claim 1, comprising consuming less than approximately 2.8 kilograms of fuel gas per metric ton of polyolefin pellets produced.

5. The method of claim 1, comprising employing the purge column as a feed tank for the extruder and utilizing a pressure in the flash chamber to convey the polyolefin particles to the purge column.

6. The method of claim 1, comprising conveying the polyolefin pellets from the pelletizer to pellet silos via a pellet water pump.

7. The method of claim 1, comprising continuously discharging the solids stream from the flash chamber to the purge column.

8. A method for operating a polyolefin manufacturing process, comprising:
   polymerizing a monomer in a polymerization reactor to produce a slurry comprising polyolefin particles and diluent;
   separating a majority of the diluent from the polyolefin particles of the slurry in a flash chamber to produce a flash stream comprising separated diluent, and a solids stream comprising the polyolefin particles and residual diluent;
   purging the solids stream in a purge column to generate a discharge stream comprising the residual diluent, and to generate a fluff stream comprising the polyolefin particles, wherein the purge column receives the solids stream directly from the flash chamber;
   extruding the polyolefin particles of the fluff stream in an extruder to form extruded polyolefin;
   pelletizing the extruded polyolefin in a pelletizer to produce polyolefin pellets; and;
   conveying the polyolefin pellets from the pelletizer to pellet silos via a pellet water pump.

9. The method of claim 8, comprising consuming less than approximately 325 kilowatt-hours of electricity per metric ton of polyolefin pellets produced.

10. The method of claim 8, comprising consuming less than approximately 144 kilograms of steam per metric ton of polyolefin pellets produced.

11. The method of claim 8, comprising consuming less than approximately 2.8 kilograms of fuel gas per metric ton of polyolefin pellets produced.

12. The method of claim 8, comprising employing the purge column as a feed tank for the extruder and utilizing a pressure in the flash chamber to convey the polyolefin particles to the purge column.

13. The method of claim 8, comprising continuously discharging the solids stream from the flash chamber directly to the purge column via a solids discharge conduit.

14. The method of claim 8, comprising continuously discharging the slurry from the polymerization reactor.

15. The method of claim 8, comprising producing at least approximately 600 million pounds of polyolefin pellets per year.

16. A method for operating a polyolefin manufacturing process, comprising:
   polymerizing a monomer in a polymerization reactor to produce a slurry comprising polyolefin particles and diluent;
   separating a majority of the diluent from the polyolefin particles of the slurry in a flash chamber to produce a flash stream comprising separated diluent, and a solids stream comprising the polyolefin particles and residual diluent;
   purging the solids stream in a purge column to generate a discharge stream comprising the residual diluent, and to generate a fluff stream comprising the polyolefin particles; and feeding the discharge stream from the purge column to a fractionation system.

17. The method of claim 16, comprising receiving the solids stream directly from the flash chamber in an extrusion/loadout system.

18. The method of claim 16, comprising extruding the polyolefin particles of the fluff stream in an extruder to form extruded polyolefin.

19. The method of claim 18, comprising pelletizing the extruded polyolefin in a pelletizer to produce polyolefin pellets.

20. The method of claim 19, comprising consuming less than approximately 445 kilowatt-hours of energy per metric ton of polyolefin pellets produced based on consumption of electricity, steam, and fuel gas.

* * * * *

UNITED STATES PATENT AND TRADEMARK OFFICE
CERTIFICATE OF CORRECTION

| | | |
|---|---|---|
| PATENT NO. | : 8,569,433 B2 | Page 1 of 1 |
| APPLICATION NO. | : 13/656357 | |
| DATED | : October 29, 2013 | |
| INVENTOR(S) | : Robert R. McElvain et al. | |

It is certified that error appears in the above-identified patent and that said Letters Patent is hereby corrected as shown below:

Title Page
Item (72) Applicants: "; Penny A. Zellers, Bartlesville, OK (US)" should be deleted.

Signed and Sealed this
Thirty-first Day of December, 2013

Margaret A. Focarino
*Commissioner for Patents of the United States Patent and Trademark Office*